United States Patent
Teramura et al.

(10) Patent No.: US 7,538,884 B2
(45) Date of Patent: May 26, 2009

(54) OPTICAL TOMOGRAPHIC IMAGING APPARATUS

(75) Inventors: Yuichi Teramura, Ashigarakami-gun (JP); Karin Kuroiwa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/951,689

(22) Filed: Dec. 6, 2007

(65) Prior Publication Data

US 2008/0137094 A1      Jun. 12, 2008

(30) Foreign Application Priority Data

Dec. 7, 2006   (JP) ............................. 2006-330878

(51) Int. Cl.
*G01B 9/02* (2006.01)
(52) U.S. Cl. ..................................... 356/489
(58) Field of Classification Search ................. 356/479, 356/497, 489, 485, 484
See application file for complete search history.

(56) References Cited

U.S. PATENT DOCUMENTS

| | | | |
|---|---|---|---|
| 6,665,320 B1 | 12/2003 | Arbore et al. | |
| 2007/0076219 A1* | 4/2007 | Toida | 356/511 |
| 2008/0117424 A1* | 5/2008 | Teramura et al. | 356/450 |
| 2008/0117427 A1* | 5/2008 | Teramura et al. | 356/484 |
| 2008/0117431 A1* | 5/2008 | Teramura | 356/511 |

FOREIGN PATENT DOCUMENTS

| | | |
|---|---|---|
| JP | 2001264246 A | 9/2001 |
| JP | 2002214125 A | 7/2002 |
| JP | 2006047264 A | 2/2006 |

OTHER PUBLICATIONS

M. Takeda et al., "Optical Frequency Scanning Interference Microscopes", Optical Engineering Contact, 2003, pp. 426-432, vol. 41, No. 7 and its partial translation.

* cited by examiner

*Primary Examiner*—Patrick J Connolly
*Assistant Examiner*—Jonathan M Hansen
(74) *Attorney, Agent, or Firm*—Sughrue Mion, PLLC

(57) ABSTRACT

An optical tomographic imaging apparatus capable of obtaining a high resolution tomographic image rapidly. Light beams swept in wavelength intermittently and repeatedly within first and second wavelength ranges respectively are outputted simultaneously from a light source unit. If the wavelength of either one of the light beams is within a fifth wavelength range, the other light beam is not outputted. The first or second wavelength range includes at least a portion of the fifth wavelength range. Each light beam is split into measuring and reference beams by a coupler. Wavelengths of reflected beams from a measuring object when the measuring beams are irradiated on the object and the reference beams are divided by a WDM coupler. The reflected beams and reference beams are combined by an optical coupler, and each interference beam produced thereby is detected with respect to each light beam as an interference signal.

16 Claims, 16 Drawing Sheets

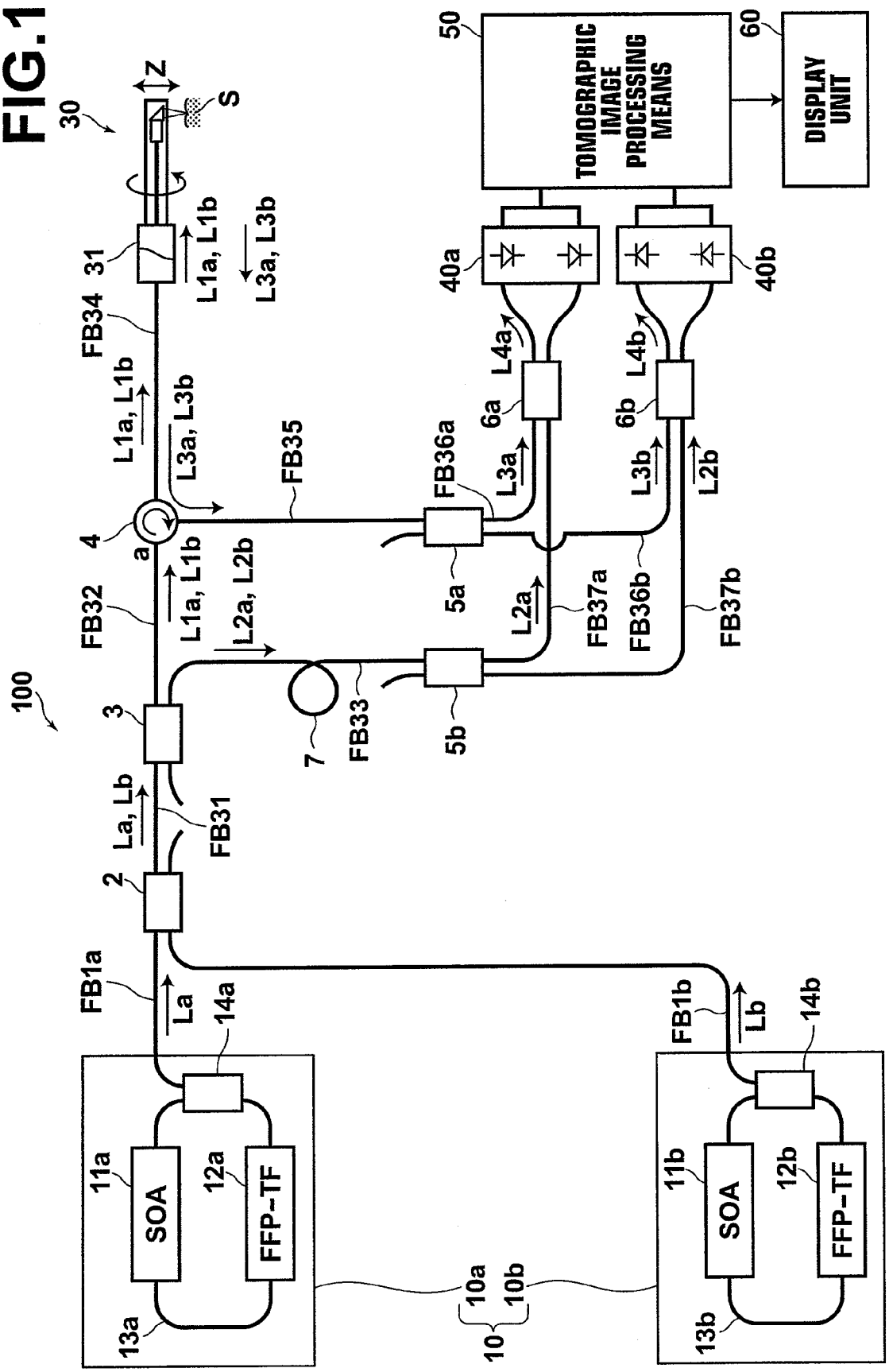

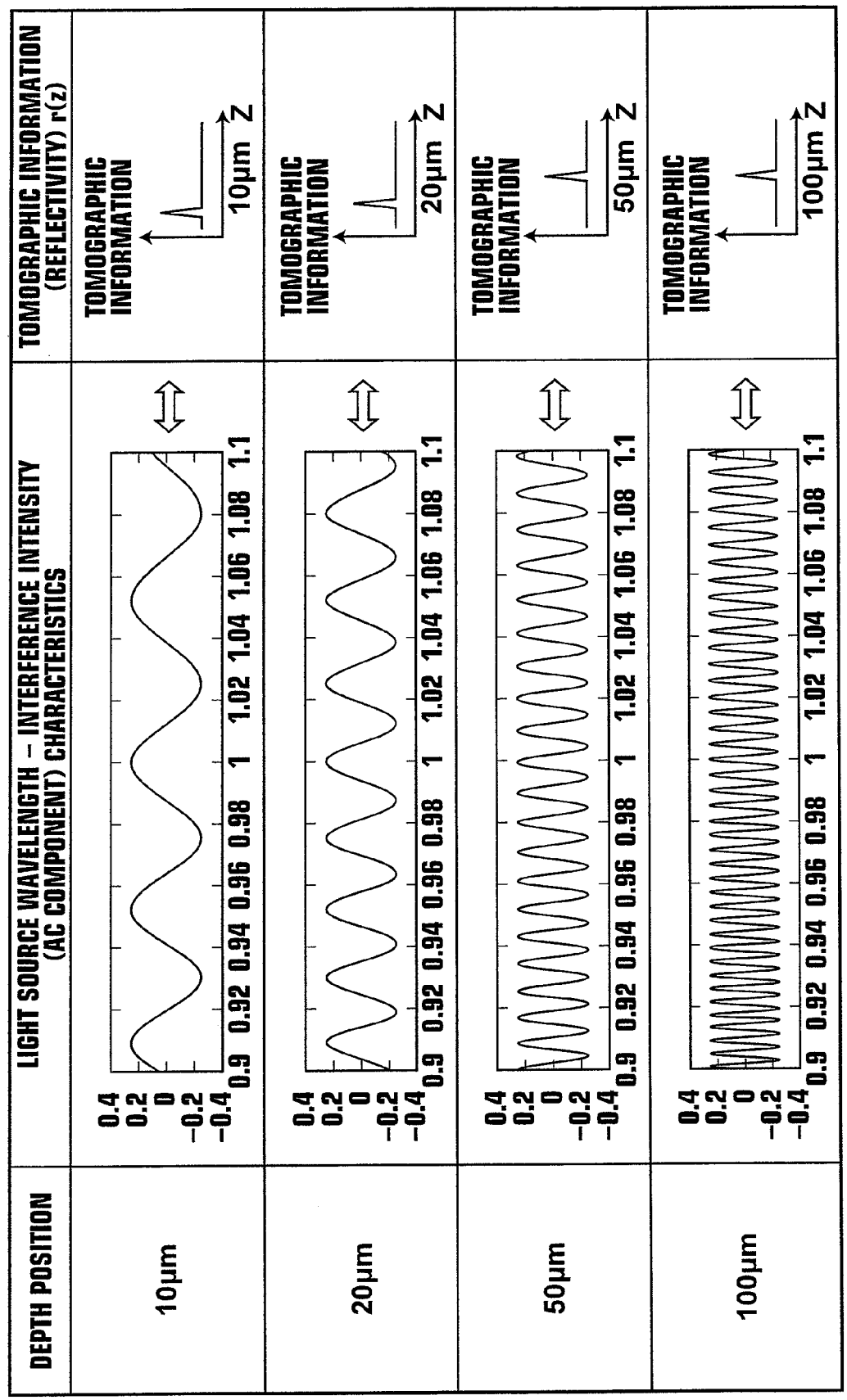

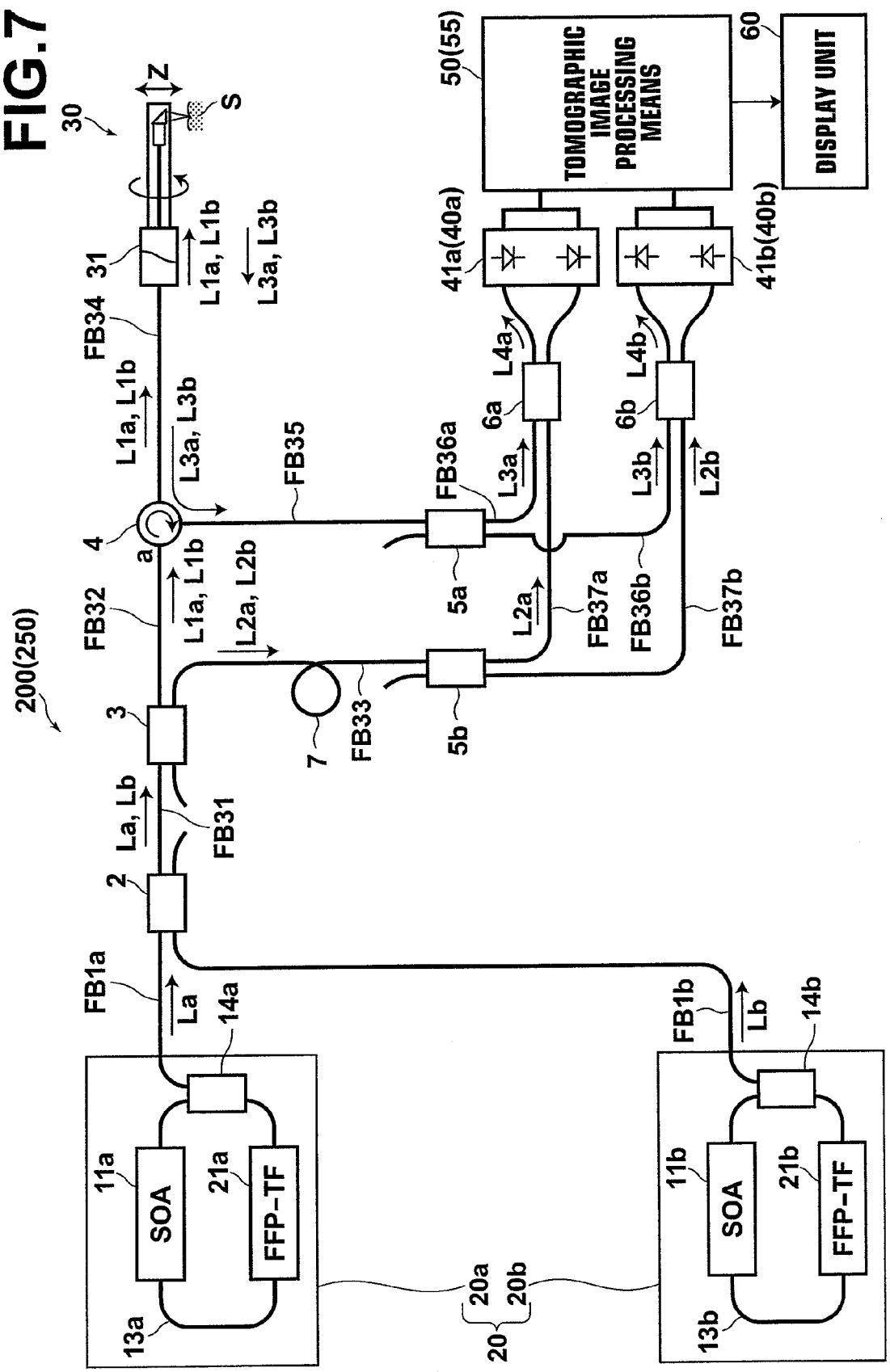

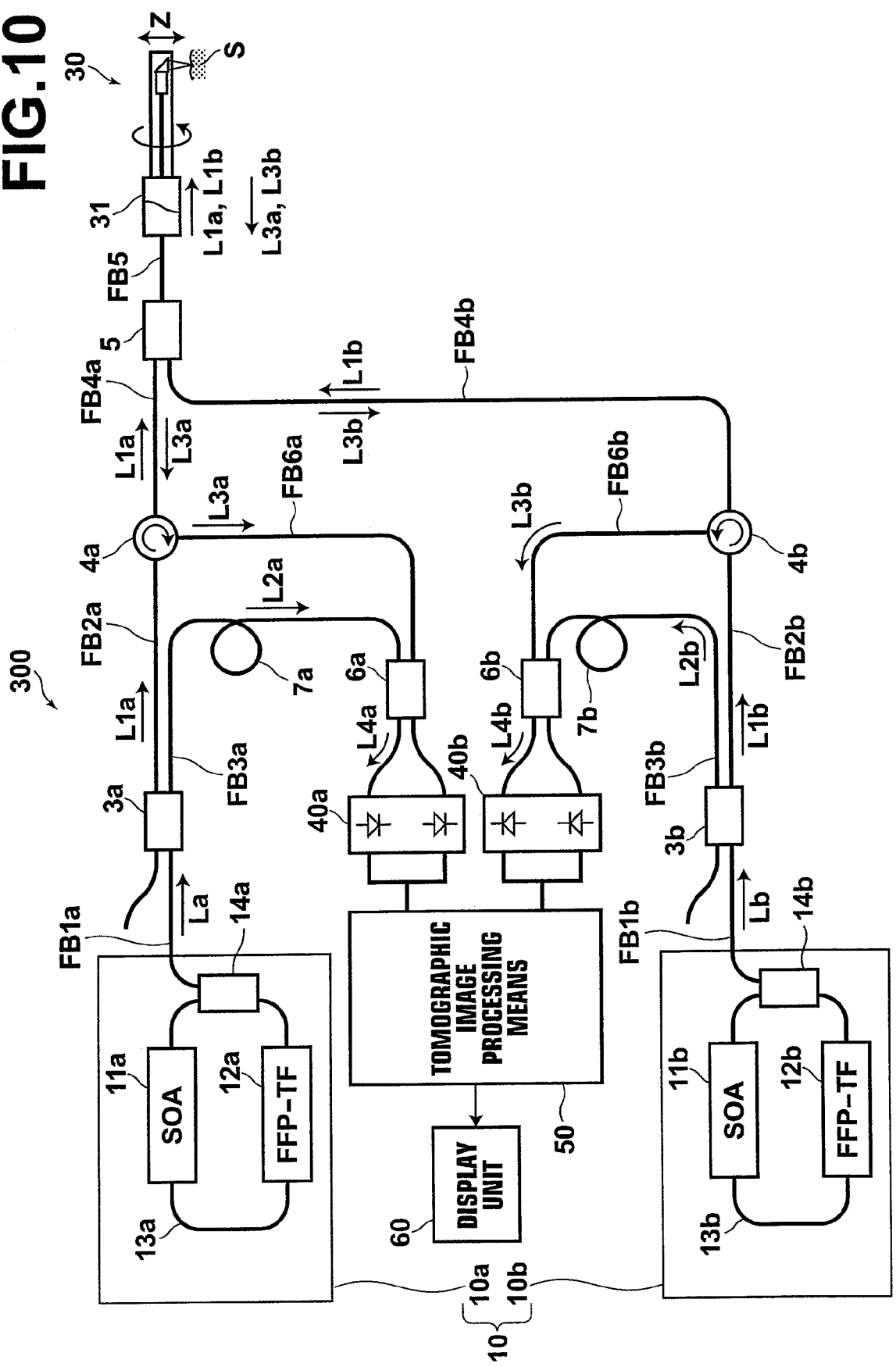

OPTICAL TOMOGRAPHIC IMAGING APPARATUS

BACKGROUND OF THE INVENTION

1. Field of the Invention

The present invention relates to an optical tomographic imaging apparatus for obtaining a tomgraphic image of a measuring object by OCT (optical coherence tomography) measurement.

2. Description of the Related Art

An optical tomographic image obtaining system using OCT measurement is sometimes used to obtain an optical tomographic image of a living tissue. In the optical tomographic image obtaining system, a low coherence light beam outputted from the light source is split into measuring and reference beams, and the measuring beam is irradiated onto a measuring object, then the reflected beam from the measuring object or backscattered light when the measuring beam is irradiated thereon is combined with the reference beam, and an optical tomographic image is obtained based on the intensity of the interference beam between the reflected beam and the reference beam. Hereinafter, reflected beam from a measuring object and backscattered light are collectively referred to as the "reflected beam".

The OCT measurement is largely categorized into TD-OCT (Time Domain OCT) measurement and FD (Fourier Domain)-OCT measurement. The TD-OCT measurement is a method for obtaining a reflected beam intensity distribution corresponding to a position in the depth direction (depth position) of a measuring object by measuring interference beam intensity while changing the optical path length of the reference light.

The FD-OCT measurement is a method for obtaining a reflected light intensity distribution corresponding to a depth position of a measuring object by measuring interference beam intensity with respect to each spectral component of the beam without changing the optical path length of the reference beam, and performing frequency analysis, typically a Fourier transform, on the obtained spectral interference intensity signals using a computer. The FD-OCT does not require the mechanical scanning used in TD-OCT, so that it has been drawing wide attention as a method that allows high speed measurement.

Typical systems that use ED-OCT measurement are SD-OCT (Spectral Domain OCT) system and SS-OCT (Swept Source OCT) system. The SD-OCT system uses a broadband and low coherence light beam, such as SLD (Super Luminescence Diode), ASE (Amplified Spontaneous Emission), or white light beam, as the light source, and forms an optical tomographic image in the following manner. The broadband and low coherence light beam is split into measuring and reference beams using Michelson interferometer or the like and the measuring beam is irradiated onto a measuring object, then a reflected beam from the measuring object when the measuring beam is irradiated thereon is caused to interfere with the reference beam and the interference beam is broken down into frequency components using a spectroscopic device, thereafter the intensity of the interference beam with respect to each frequency component is measured using a detector array including elements, such as photodiodes, disposed in an array and an optical tomographic image is formed by performing Fourier transform on the obtained spectral interference signals using a computer.

In the mean time, the SS-OCT system uses a laser that temporally sweeps the optical frequency, in which the reflected beam is caused to interfere with the reference beam at each wavelength, then the temporal waveform of the signal corresponding to the temporal change in the optical frequency is measured and an optical tomographic image is formed by performing Fourier transform on the obtained spectral interference signals using a computer.

For the OCT system, in order to obtain a high resolution and high quality image, it is necessary to broaden the wavelength range of the light source and to increase the number of corresponding data points. In the SD-OCT system, however, the interference beam is generally detected with respect to each wavelength using a detector array including elements, such as photodiodes, disposed in an array, so that the number of data points is limited by the number of elements of the detector array. At present, it is not desirable to increase the number of elements of the detector array for increasing the number of data points, since such increase would result in cost increase, decreased manufacturability, reduced measuring rate, and the like. On the other hand, in the SS-OCT system, in order to increase the number of data points, for example, it is just necessary to increase the sampling frequency of the circuit that converts an optical current signal from the detector to a digital value if the frequency sweep period of the light source is assumed to be constant, so that it may be realized easily at low cost with a high measuring rate.

In various types of OCT measurements described above, it is known that the measuring beam with a broad spectral width is used in order to improve spatial resolution as described, for example, in Japanese Unexamined Patent Publication No. 2002-214125. This patent publication discloses a light source including a plurality of light sources, each emitting a light beam having a different spectral range, and an optical coupler for combining the light beams emitted from the respective light sources to emit a single-wave light beam as a light source capable of emitting a light beam having a broad spectral width.

For the SD-OCT measurement, a method for forming a continuous spectrum by combining light beams from a plurality of gain media, each having a overlapping wavelength range with each other, is disclosed in Japanese Unexamined Patent Publication No. 2001-264246. As for the method of forming a continuous spectrum through wavelength combination for SS-OCT, a structure including a plurality of wavelength scanning light sources, each having a gain medium and a wavelength selection element is disclosed in Japanese Unexamined Patent Publication No. 2006-047264. Further, U.S. Pat. No. 6,665,320 discloses a structure that simultaneously controls light beams from a plurality of gain media using a single wavelength selection element.

Where light beams from a plurality of light sources are combined and used in order to obtain high spatial resolution, the conventional SS-OCT system poses a problem that, when light beams having different wavelengths are outputted from a plurality of light sources and irradiated onto a measuring object at the same time, the interference information provided by the plurality of light beams is mixed up and unable to be detected since the detector of the system includes only a single element.

For this reason, in the systems described in Japanese Unexamined Patent Publication No. 2006-047264, and U.S. Pat. No. 6,665,320, a configuration is adopted in which only a single wavelength is inputted to the detector at a time by controlling the light source or using a switching element. Such method, however, poses a problem that the measuring rate is reduced since it takes time to irradiate all of the wavelengths of the measuring beam, though it may provide a broadband beam as the measuring beam.

The present invention has been developed in view of the circumstances described above, and it is an object of the present invention to provide an optical tomographic imaging apparatus capable of rapidly obtaining a high resolution tomographic image.

SUMMARY OF THE INVENTION

An optical tomographic imaging apparatus of the present invention includes:

a light source unit having a first light source that outputs a first light beam which is swept in wavelength repeatedly within a first wavelength range, and a second light source that outputs a second light beam which is swept in wavelength repeatedly within a second wavelength range which is different in range from the first wavelength range, in which a part of the wavelength sweep of the first light beam and a part of the wavelength sweep of the second light beam are performed at the same time;

a beam splitting means that splits the first and second light beams into first measuring and reference beams, and second measuring and reference beams respectively;

a beam combining means that combines first and second reflected beams, which are the reflected beams from a measuring object when the first and second measuring beams are irradiated on the measuring object, with the first and second reference beams respectively;

a first interference beam detection means that detects a first interference beam produced when the first reflected beam is combined with the first reference beam by the beam combining means as a first interference signal, a second interference beam detection means that detects a second interference beam produced when the second reflected beam is combined with the second reference beam by the beam combining means as a second interference signal;

a tomographic image processing means that generates a tomographic image of the measuring object using the first and second interference signals detected by the first and second interference beam detection means respectively; and a wavelength dividing means that outputs the reflected beams from the measuring object or the interference beams to the side of the first interference beam detection means when the wavelengths thereof are within a third wavelength range, to the side of the second interference beam detection means when the wavelengths thereof are within a fourth wavelength range which is separated from the third wavelength range, or to the side of the first beam detection means and the side of the second interference beam detection means when the wavelengths thereof are within a fifth wavelength range between the third and fourth wavelength ranges, wherein:

the first wavelength range and/or the second wavelength range includes at least a portion of the fifth wavelength range; and the tomographic image is generated using only the first or second interference signal which is based on a light beam outputted from either one of the first and second light sources while light beams with wavelengths within the fifth wavelength range are outputted from either one of the light sources.

The tomographic image processing means may be a means that uses only an interference signal based on a light beam outputted from either one of the first and second light sources as interference signals while light beams with wavelengths within the fifth wavelength range are outputted from either one of the light sources.

Further, the interference beam detection means may be a means that detects only the first or second interference signal which is based on a light beam outputted from either one of the first and second light sources while light beams with wavelengths within the fifth wavelength range are outputted from either one of the light sources.

The light source unit may be a unit that outputs a light beam with a wavelength within the fifth wavelength range only from either one of the first and second light sources while light beams with wavelengths within the fifth wavelength range are outputted from either one of the light sources.

Further, the light source unit may be a unit that outputs a light beam only from either one of the first and second light sources while light beams with wavelengths within the fifth wavelength range are outputted from either one of the light sources.

Still further, the light source unit may be a unit that outputs a light beam with a wavelength within the third wavelength range from the first light source and a light beam with a wavelength within the fourth wavelength range from the second light source at the same time within a predetermined time period, and causes a light beam to be outputted only from the first light source while light beams with wavelengths within the fifth or fourth wavelength range are outputted from the first light source and only from the second light source while light beams with wavelengths within the fifth or third wavelength range are outputted from the second light source.

Further, the first and second wavelength ranges may be those partially overlapping with each other.

Still further, the tomographic image processing means may be a means that connects first and second interference signals partially overlapping with each other in wavelength range obtained respectively by the first and second interference beam detection means to form a single integrated interference signal, and generates the tomographic image based on the integrated interference signal.

Further, the wavelength dividing means may be a wavelength division multiplexing coupler.

Still further, the beam splitting means and beam combining means may be provided for each of the first and second light beams.

According to the optical tomographic imaging apparatus according to the present invention, a wavelength dividing means is provided, which outputs the reflected beams from the measuring object or the interference beams to the side of the first interference beam detection means when the wavelengths thereof are within a third wavelength range, to the side of the second interference beam detection means when the wavelengths thereof are within a fourth wavelength range which is separated from the third wavelength range, or to the side of the first beam detection means and the side of the second interference beam detection means when the wavelengths thereof are within a fifth wavelength range between the third and fourth wavelength ranges. Thus, while light beams with wavelengths within the third wavelength range and light beams with wavelengths within the fourth wavelength range are outputted from the first and second light sources respectively, the wavelengths of the light beams outputted from the respective light sources are divided by the wavelength dividing means and received by the respective interference beam detection means. Consequently, even if a plurality of light beams having different wavelengths is irradiated on the measuring object at the same time, a plurality of interference signals obtained from a plurality of interference beams is not mixed up, and the plurality of interference signals with respect to each light beam are obtained at the same time. This may increase the measuring rate in comparison with the past. The referent of "with respect to each light beam" as used herein means with respect to light beams in the same wavelength range.

Further, the tomographic image is generated using only the first or second interference signal which is based on a light beam outputted from either one of the first and second light sources while light beams with wavelengths within the fifth wavelength range are outputted from either one of the light sources. Consequently, even while light beams with wavelengths within the fifth wavelength range, for which an exact wavelength division is difficult to be performed by the wavelength dividing means, are irradiated, a plurality of interference signals obtained from a plurality of interference beams is not mixed up, and the plurality of interference signals with respect to each light beam are obtained at the same time. Accordingly, interference signals extending over a broadband and continuous spectrum may be obtained, and a higher resolution tomographic image may be obtained rapidly.

Still further, whereas in the conventional tomographic imaging apparatus having a plurality of light sources or a plurality of gain media, synchronization control is required such that only a single wavelength is inputted to the detector, the tomographic imaging apparatus of the present invention does not require such control, so that the apparatus may be simplified. Further, in the tomographic imaging apparatus of the present invention, each of the interference beam detection means may be structured optimally according to the wavelength range of each of the light beams, so that the detection accuracy of each of the interference beam detection means may be improved and the resolution of a tomographic image to be obtained may be increased. Still further, component parts used in the interference beam detection means need only to cover the wavelength range of each light beam and not to cover a broadband light beam. This may relax the restrictions on the component parts to be used in comparison with the past and allow the use of general purpose component parts, so that the apparatus may be constructed easily.

BRIEF DESCRIPTION OF THE DRAWINGS

FIG. 1 is a schematic configuration diagram of the optical tomographic imaging apparatus according to a first embodiment of the present invention.

FIG. 5 illustrates tomographic information at each depth position obtained by frequency analyzing an interference beam detected by the interference beam detection means shown in FIG. 1.

FIG. 7 is a schematic configuration diagram of the optical tomographic imaging apparatus according to second and third embodiments of the present invention.

FIG. 10 is a schematic configuration diagram of the optical tomographic imaging apparatus according to a fourth embodiment of the present invention.

DESCRIPTION OF THE PREFERRED EMBODIMENTS

Figure 2A:
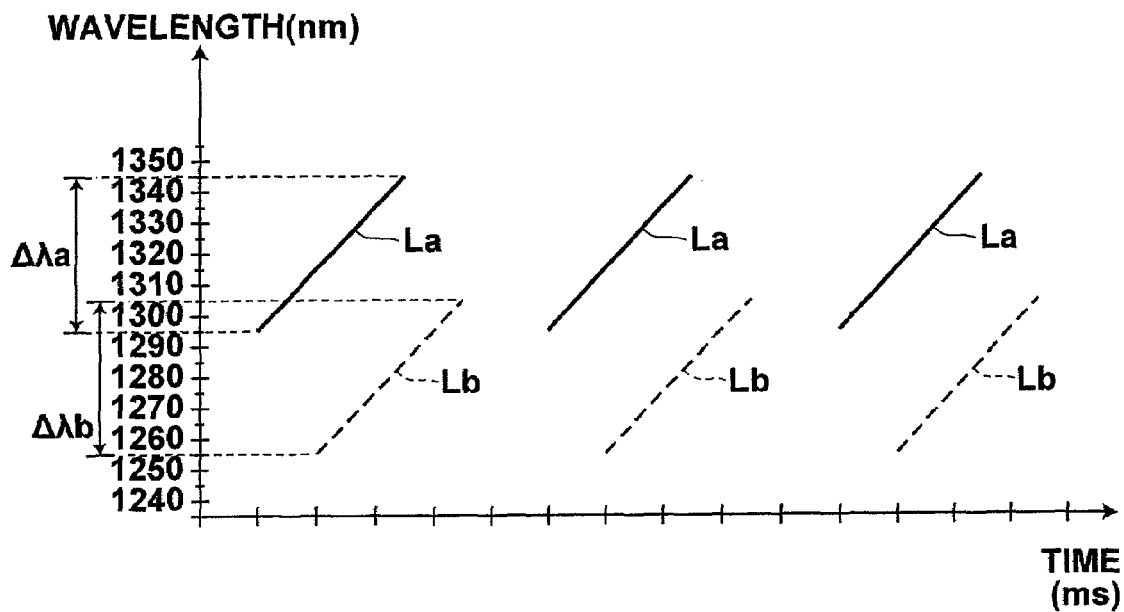
FIG. 2A illustrates wavelength sweep of the light source unit shown in FIG. 1.

Hereinafter, embodiments of the optical tomographic imaging apparatus of the present invention will be described in detail with reference to the accompanying drawings. FIG. 1 is a schematic configuration diagram of the optical tomographic imaging apparatus 100 according to a first embodiment of the present invention. The optical tomographic imaging apparatus 100 is, for example, an apparatus for obtaining a tomographic image of a measuring object such as a living tissue or a cell in a body cavity by the aforementioned SS-OCT measurement using a Mach-Zehnder interferometer.

The optical tomographic imaging apparatus 100 includes: a light source unit 10 having a light source 10a that outputs a light beam La which is swept in wavelength within a wavelength range Δλa (1295 to 1345 nm) at a constant period and a light source 10b that outputs a light beam Lb which is swept in wavelength within a wavelength range Δλb (1255 to 1305 nm) at a constant period; a beam combining means 2 that combines the light beams La and Lb outputted from the light source unit 10; a beam splitting means 3 that splits the light beam La into a measuring beam L1a and a reference beam L2a, and the light beam Lb into a measuring beam L1b and a reference beam L2b; and a circulator 4 that outputs the measuring beams L1a and L1b inputted from port "a" to port "b", and outputs reflected beams L3a and L3b inputted from port "b" to port "c". The apparatus 100 further includes: a wavelength dividing means 5a that divides between the reflected beams L3a and L3b; a wavelength dividing means 5b that divides between the reference beams L2a and L2b; a beam combining/splitting means 6a that combines the reflected beam L3a with the reference beam L2a; a beam combining/splitting means 6b that combines the reflected beam L3b with the reference beam L2b; an interference beam detection means 40a that detects an interference beam produced when the reflected beam L3a is combined with the reference beam L2a by the beam combining/splitting means 6a as an interference signal; an interference beam detection means 40b that detects an interference beam produced when the reflected beam L3b is combined with the reference beam L2b by the beam combining/splitting means 6b as an interference signal; and a tomographic image processing means 50 that obtains a tomographic image of a measuring object S using the interference signals detected by the interference beam detection means 40a and 40b.

It is noted that the measuring beam L1a, reference beam L2a, reflected beam L3a, and interference beam L4a are the light beams based on the light beam La and in the same wavelength range as that of the light beam La. Likewise, the measuring beam L1b, reference beam L2b, reflected beam L3a, and interference beam L4a are the light beams based on the light beam Lb and in the same wavelength range as that of the light beam Lb.

The light source 10 includes the light source 10a, which is a wavelength swept light source that outputs the light beam La which is swept in wavelength intermittently and repeatedly within a wavelength range Δλa (1295 to 1345 nm) and the light source 10b, which is a wavelength swept light source that outputs the light beam Lb which is swept in wavelength intermittently and repeatedly within a wavelength range Δλb (1255 to 1305 nm).

The light source 10a of the light source unit 10 includes, as the major components, a semiconductor optical amplifier (SOA) 11a as a gain medium, a wavelength selection means 12a constituted by a fiber Fabry-Perot tunable filter (FFP-TF), and an optical fiber 13a connected to both ends of the semiconductor optical amplifier 11a and wavelength selection means 12a for forming a ring-shaped resonator.

The semiconductor optical amplifier 11a has functions, through injection of drive current therein, to output a weak emission light beam to an optical fiber 13a connected to one end thereof and to amplify a light beam inputted from the optical fiber 13a connected to the other end thereof. The semiconductor optical amplifier 11a is formed of, for example, an InGaAsP device having an emission region in the wavelength range from 1250 to 1350 nm. By the semiconductor optical amplifier 11a, the laser beam is oscillated in the ring-shaped resonator, which is branched by an optical coupler 14a with a branching ratio of 10:90 connected to the optical fiber 13a, then guided through an optical fiber FB1a, and outputted to outside as the light beam La. The wavelength selection means 12a is constructed to change the wavelength of the light to be transmitted therethrough at a constant period within the wavelength range Δλa (1295 to 1345 nm).

The light source 10b is structured in the same manner as the light source 10a, and includes as the major components: a semiconductor optical amplifier 11b as a gain medium; a wavelength selection means 12b constituted by a FFP-TP; and an optical fiber 13b connected to both ends of the SOA 11b and FFP-TP 12b for forming a ring-shaped resonator. The semiconductor optical amplifier 11b is also formed of an InGaAsP device. The laser beam oscillating in the resonator of the light source 10b is branched by an optical coupler 14b with a branching ratio of 10:90 connected to the optical fiber 13b, then guided through an optical fiber FB1b, and outputted to outside as the light beam Lb. In the light source 10b, the wavelength selection means 12b is constructed to change the wavelength of the light to be transmitted therethrough at a constant period within the wavelength range Δλb (1255 to 1305 nm).

Figure 2B:
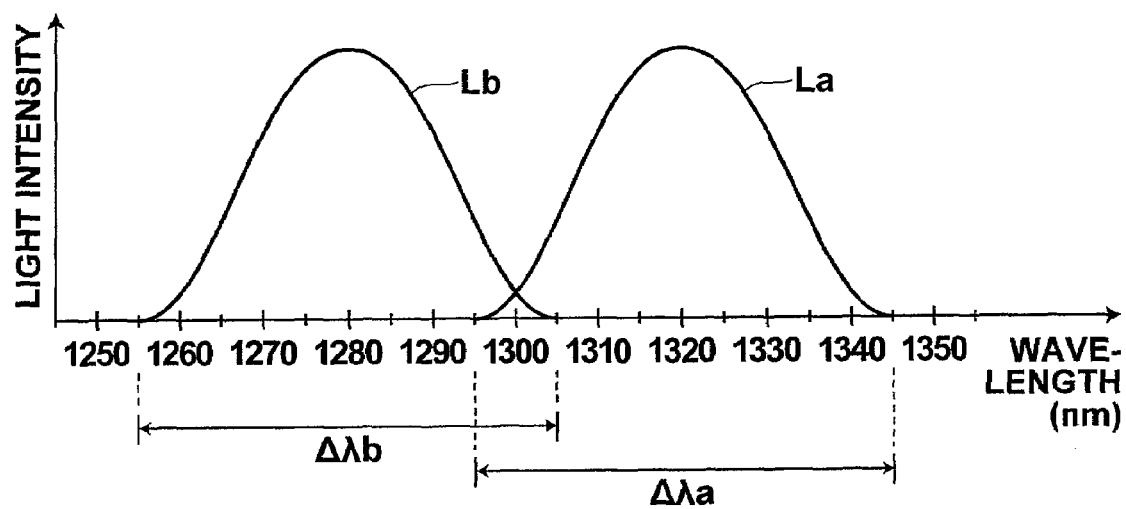
FIG. 2B illustrates a spectrum of light outputted from the light source unit shown in FIG. 1.

Wavelength sweeps and spectra of the light sources 10a and 10b are shown in FIGS. 2A and 2B respectively with the designations La and Lb. The light source 10a sweeps the wavelength at an interval of 5 ms within the wavelength range Δλa (1295 to 1345 nm). It is noted that the light source 10a emits the light beam La for the first 2.5 ms and does not emit light for the remaining 2.5 ms. The light source 10b sweeps the wavelength at an interval of 5 ms within the wavelength range Δλb (1255 to 1305 nm). It is also noted that the light source 10b emits the light beam Lb for the first 2.5 ms and does not emit light for the remaining 2.5 ms. In addition, the sweeping of the light beam Lb in the light source 10b is initiated 1 ms later from the initiation of the sweeping of the light beam La in the light source 10a.

The light beam La propagated through the optical fiber FB1a and the light beam Lb propagated through the optical fiber FB1b are combined by the beam combining means 2 and outputted to an optical fiber FB31, which propagates through the optical fiber FB31 and inputted to the beam splitting means 3.

The beam splitting means 3 includes, for example, a 2×2 optical coupler with a branching ratio of 90:10. The beam splitting means 3 splits the light beam La into the measuring beam L1a and reference beam L2a, and the light beam Lb into the measuring beam L1b and reference beam L2b. Here, the beam splitting means 3 splits the respective light beams into the respective measuring and reference beams at a ratio of 90:10. The measuring beams L1a and L1b are outputted to an optical fiber FB32, and the reference beams L2a and L2b are outputted to an optical fiber FB33.

The circulator 4 is provided in the optical path between the light splitting means 3 and a probe 30, and the measuring beams L1a and L1b inputted from the port "a" on the side of the beam splitting means 3 are outputted to an optical fiber FB34 from the port "b" on the side of the probe 30.

The probe 30 guides the measuring beams L1a and L1b inputted through an optical rotary connector 31 to the measuring object S, and the measuring beams L1a and L1b are irradiated on the same position of the measuring object S at the same time. The probe 30 also guides the reflected beams L3a and L3b from the measuring object S when the measuring beams L1a and L1b are irradiated onto the measuring object S. The probe 30 is structured such that the fiber section at the distal side of the optical rotary connector 31 is rotated by a not shown motor to circularly scan the beams on the sample, which enables a two dimensional tomographic image measurement. Further, a three dimensional tomographic image measurement is feasible by scanning the tip of the probe 30 by a not shown motor in the direction orthogonal to the plane formed by the scan circle of the light path. The probe 30 is detachably attached to the optical fiber FB 34 through a not shown optical connector. It should be appreciated that the shape of the probe tip and the scanning direction are not limited to those described above. For example, the two dimensional scanning may be performed by providing a high speed scanning mirror at the distal end of the fiber.

The reflected beams L3a and L3b outputted from the probe 30 through the optical fiber FB34 are inputted to the port "b" of the circulator 4, outputted to an optical fiber FB35 from the port "c", and then inputted to the wavelength dividing means 5a.

The wavelength dividing means 5a is formed of, for example, a WDM coupler, and outputs light beams with wavelengths not shorter than 1310 nm to an optical fiber FB36a, light beams with wavelengths not longer than 1290 nm to an optical fiber FB36b, and light beams with wavelengths within the wavelength range from 1290 to 1310 nm to both sides. More specifically, light beams within the wavelength range from 1290 to 1310 nm are branched to the optical fiber FB36a at a branching ratio that varies approximately from 0 to 100%, and to the optical fiber FB36b at a branching ratio that varies approximately from 100 to 0%. Accordingly, most of the reflected beam L3a is outputted to the optical fiber FB36a, and most of the reflected beam L3b is outputted to the optical fiber FB36b. In the mean time, a portion of the reflected beam L3a (portion of light beams within the wavelength range from 1295 to 1310 nm) is outputted to the optical fiber FB36b (which is, hereinafter, referred to as "leak reflected beam L3as), and a portion of the reflected beam L3b (portion of light beams within the wavelength range from 1290 to 1305 nm) is outputted to the optical fiber FB36a (which is, hereinafter, referred to as "leak reflected beam L3bs). The beam combining/splitting means 6a is coupled to the optical fiber FB36a, and the beam combining/splitting means 6b is coupled to the optical fiber FB36b.

In the meantime, the reference beams L2a and L2b split by the beam spitting means 3 are guided through an optical fiber FB33 and inputted to the wavelength dividing means 5b after the optical path length thereof is controlled by an optical path length control means 7.

The wavelength dividing means 5b is formed of, for example, a WDM coupler, like the wavelength dividing means 5a, and outputs light beams with wavelengths not shorter than 1310 nm to an optical fiber FB37a, light beams with wavelengths not longer than 1290 nm to an optical fiber FB37b, and light beams with wavelengths within the wavelength range from longer than 1290 to shorter than 1310 nm to both sides. That is, most of the reference beam L2a is outputted to the optical fiber FB37a from the wavelength dividing means 5b, and a portion thereof is outputted to the optical fiber FB37b (reference beam L2a outputted to the optical fiber FB37b is, hereinafter, referred to as "leak reference beam L2as). Likewise, most of the reference beam L2b is outputted to the optical fiber FB37b from the wavelength dividing means 5b, and a portion thereof is outputted to the optical fiber FB37a (reference beam L2b outputted to the optical fiber FB37a is, hereinafter, referred to as "leak reference beam L2bs). The beam combining/splitting means 6a is coupled to the optical fiber FB37a, and the beam combining/splitting means 6b is coupled to the optical fiber FB37b.

In the beam combining/splitting means 6a, the reflected beam L3a is combined with the reference beam L2a, and an interference beam L4a produced is divided into halves and outputted to the interference beam detection means 40a. In the beam combining/splitting means 6b, the reflected beam L3b is combined with the reference beam L2b, and an interference beam L4b produced is divided into halves and outputted to the interference beam detection means 40b. The interference beam detection means 40a and 40b perform balanced detection to detect the halved interference beams L4a and 14b using two optical detection devices respectively. This structure reduces effects of fluctuations in the light intensity so that a clearer image may be obtained.

The interference beam detection means 40a and 40b have functions to perform photoelectrical conversions on the interference beams L4a and L4b respectively to detect them as a plurality of interference signals ISa and ISb with respect to the wavelength ranges Δλa and Δλb of the light beams La and Lb. At this time, the interference signals ISa and ISb with respect to the respective spectra of the light sources 10a and 10b are observed in the interference beam detection means 40a and 40b respectively. The interference signals ISa and ISb are outputted to the tomographic image processing means 50.

The tomographic image processing means 50 includes a computer system, such as a personal computer. The tomographic image processing means 50 extracts the interference signals ISa and ISb from the signals photoelectrically converted by the interference beam detection means 40, associates the interference signals ISa and ISb with the oscillation frequencies of the wavelength swept light sources, and performs signal integration so as to become equally frequency spaced interference signals, thereby generating a single broadband interference signal ISO. Then, it obtains the reflected light intensity of the measuring object S at each depth position by performing a frequency analysis, typically a Fourier transform, on the interference signal ISO.

Figure 3:
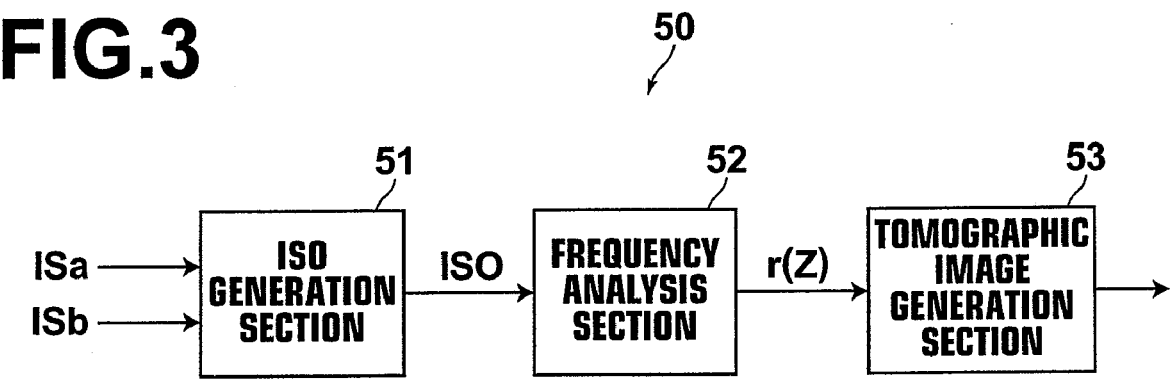
FIGS. 3 is a block diagram illustrating an example of the tomographic image processing means shown in FIG. 1.

More specifically, as illustrated in FIG. 3, the tomographic image processing means 50 includes: an ISO generation section 51 that generates the interference signal ISO from the interference signals ISa and ISb; a frequency analysis section 52 that detects tomographic information r(z) at each depth position by performing a frequency analysis on the interference signal ISO; and a tomographic image generation section 53 that generates a tomographic image using the tomographic information r(z).

Here, a method for calculating the tomographic information (reflectivity) r(z) based on the interference signal ISO will be described briefly. For more detailed description, reference is made to the literature by M. Takeda, "Optical Frequency Scanning Interference Microscopes", Optical Engineering Contact, Vol. 41, No. 7, pp. 426-432, 2003.

Figure 4:
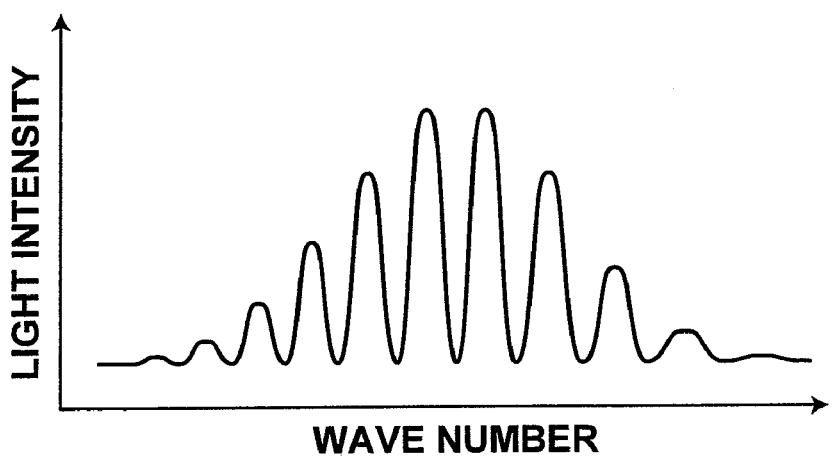
FIG. 4 is a graph illustrating an example interference beam detected by the interference beam detection means shown in FIG. 1.

Assuming the light intensity of the interference pattern with respect to each optical path length difference l to be S(l) when the measuring beam is irradiated onto the measuring object S, and reflected beam from each depth of the measuring object S interferes with the reference beam with various optical path length differences, the light intensity I(k) detected by the interference beam detection means 40 may be expressed in the following and represented, for example, by the graph illustrated in FIG. 4.

$$I(k) = \int_0^\infty S(l)[1 + \cos(kl)]dl \quad (1)$$

where, k is the wave number, l is the optical path length difference between the reference beam and reflected beam. Formula (1) above may be regarded as an interferogram in the optical frequency domain with the wave number k as a parameter. Accordingly, the light intensity S(l) of the interference signal ISO in each wavelength may be determined by performing, in the frequency analysis means 52, a frequency analysis, through Fourier transform, on the spectral interference pattern detected by the interference beam detection means 40, thereby the reflectivity at each depth position may be obtained, as illustrated in FIG. 5. Then, information of the distance from the measurement start position and the tomographic information r(z) are obtained. The frequency analysis means 52 may be a means that obtains the tomographic information r(z) using any known spectral analysis technology such as, for example, maximum entropy measurement (MEM) or Yule-Walker method, other than the Fourier transform described above.

The tomographic image generation section 53 generates a tomographic image using the tomographic information r(z) detected by the frequency analysis section 52. More specifically, each of the measuring beams L1a and L1b is irradiated onto the measuring object S while it is scanned in the direction orthogonal to the depth direction "z" of the measuring object S. Then, in the tomographic image generation section 53, the tomographic information r(z) for each depth position is obtained at a plurality of measuring points. Thereafter, the tomographic image generation section 53 generates a two-dimensional or three-dimensional tomographic image using the plurality of tomographic information r(z) obtained at the respective measuring points.

An example operation of the optical tomographic imaging apparatus 100 will now be described. First, the overall operation will be described briefly, and then an operation related to leak reflected beams will be described in detail. The light beam La, swept in wavelength within the wavelength range Δλa (1295 to 1345 nm) is outputted from the light source 10a, and inputted to the beam splitting means 3 through the optical fiber FB1a, beam combining means 2, and the optical fiber FB31. In the beam splitting means 3, the light beam La is split into the measuring beam L1a and reference beam L2a, and the measuring beam L1a is outputted to the optical fiber FB32, and the reference beam L2a is outputted to the optical fiber FB33. The measuring beam L1a is guided through the optical fiber FB32 to the circulator 4, then after the circulator 4 guided through the optical fiber FB34 to the probe 30 through the optical rotary connector 31.

In the mean time, the light beam Lb, swept in wavelength within the wavelength range Δλb (1255 to 1305 nm) is outputted from the light source 10b, and inputted to the beam splitting means 3 through the optical fiber FB1b, beam combining means 2, and the optical fiber FB31. In the beam splitting means 3, the light beam Lb is split into the measuring beam L1b and reference beam L2b, and the measuring beam L1a is outputted to the optical fiber FB32, and the reference beam L2b is outputted to the optical fiber FB33. The measuring beam L1b is guided through the optical fiber FB32 to the circulator 4, then after the circulator 4 guided through the optical fiber FB34 to the probe 30 through the optical rotary connector 31.

The measuring beams L1a and L1b are guided through the probe 30 and irradiated onto the measuring object S. Then, the reflected beams L3a and L3b from the measuring object S at each depth position "z" are inputted to the probe 30, propagated through the reverse path of the measuring beams, and inputted to port "b" of the circulator 4. The reflected beams L3a and L3b inputted to port "b" of the circulator 4 are outputted to the optical fiber FB35 from port "c", and inputted to the wavelength dividing means 5a.

In the wavelength dividing means 5a, most of the reflected beam 13a is outputted to the optical fiber 36a and most of the reflected beam L3b is outputted to the optical fiber FB36b. The leak reflected beam L3as, which is a portion of the reflected beam L3a (portion of light beams within the wavelength range from 1295 to 1310 nm) is outputted to the optical fiber FB36b, and The leak reflected beam L3bs, which is a portion of the reflected beam L3b (portion of light beams within the wavelength range from 1290 to 1305 nm) is outputted to the optical fiber FB36a.

In the mean time, the reference beams L2a and L2b split by the beam splitting means 3 are guided through the optical fiber FB33 and inputted to the wavelength dividing means 5b after the optical path length thereof is controlled by the optical path length control means 7 provided in the middle of the optical fiber FB33.

Most of the reference beam L2a is outputted to the optical fiber FB37a from the wavelength dividing means 5b, and the leak reference beam L2as is outputted to the optical fiber FB37b. Likewise, most of the reference beam L2b is outputted to the optical fiber FB37b from the wavelength dividing means 5b, and the leak reference beam L2bs is outputted to the optical fiber FB37a.

In the beam combining/splitting means 6a, the reflected beam L3a is combined with the reference beam L2a, thereby an interference beam L4a is generated, which is divided into halves and inputted to the interference beam detection means 40a. Likewise, in the beam combining/splitting means 6b, the reflected beam L3b is combined with the reference beam L2b, thereby an interference beam L4b is generated, which is divided into halves and inputted to the interference beam detection means 40b. The interference beam detection means 40a and 40b perform balanced detection to detect the halved interference beams L4a and L4b using two optical detection devices respectively. This structure reduces effects of fluctuations in the light intensity so that a clearer image may be obtained.

The interference beam detection means 40a and 40b perform photoelectrical conversions on the interference beams La and Lb respectively to detect them as a plurality of interference signals ISa and ISb with respect to the wavelength ranges Δλa and Δλb of the light beams La and Lb, and output to the tomographic image processing means 50.

In the tomographic image processing means 50, the interference beam ISO is generated from the interference signals ISa and ISb, and the tomographic information r(z) at each depth position is calculated from the interference beam ISO, thereby a two-dimensional optical tomographic image is generated. Then, the generated optical tomographic image is displayed on the display unit 60 which includes a CRT (Cathode Ray Tube), a liquid crystal display, or the like.

Figure 6A:
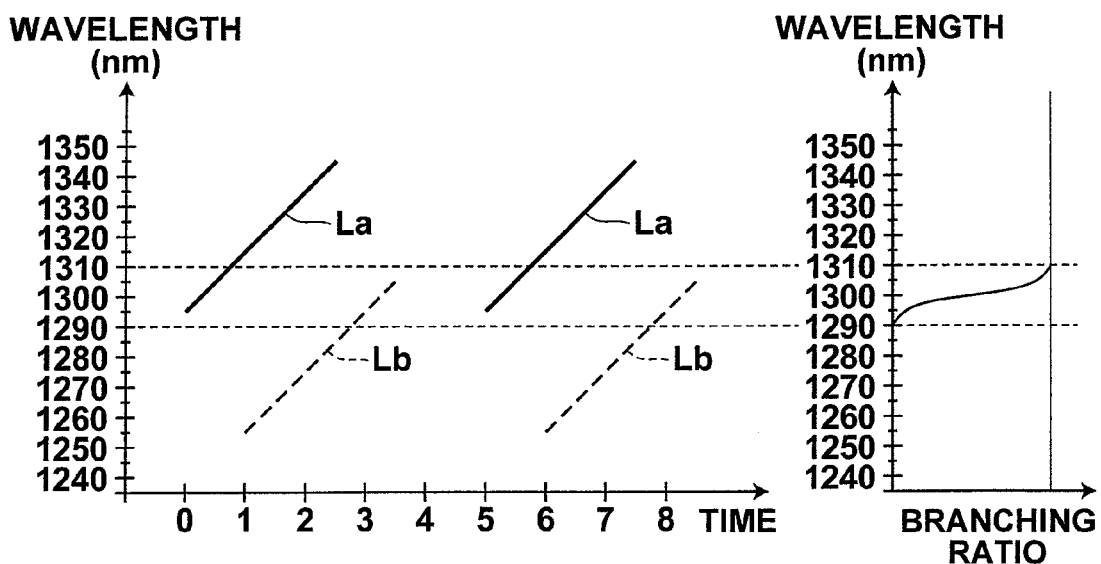
FIGS. 6A to 6D illustrate an operation of the first embodiment of the present invention.
Figure 6B:
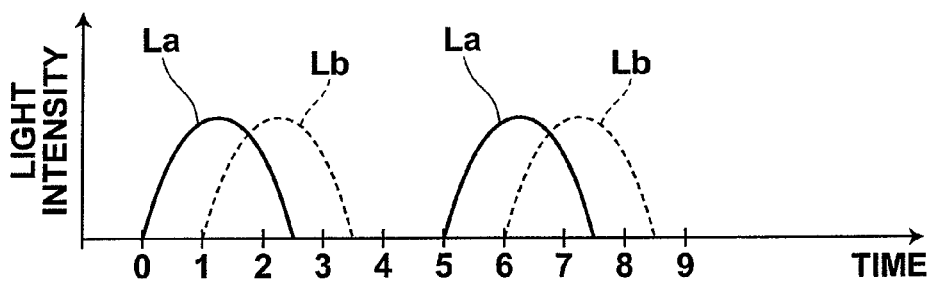
Figure 6C:
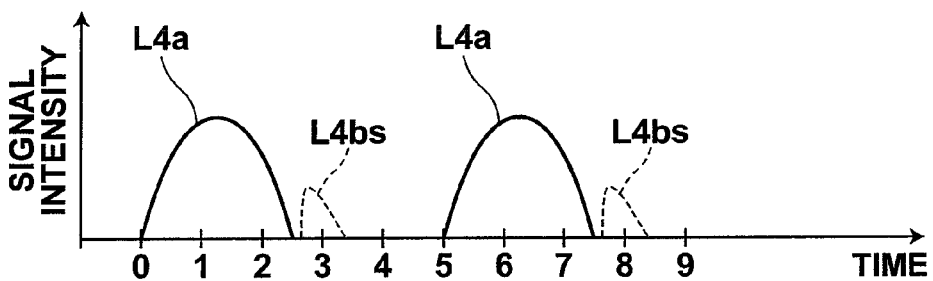
Figure 6D:
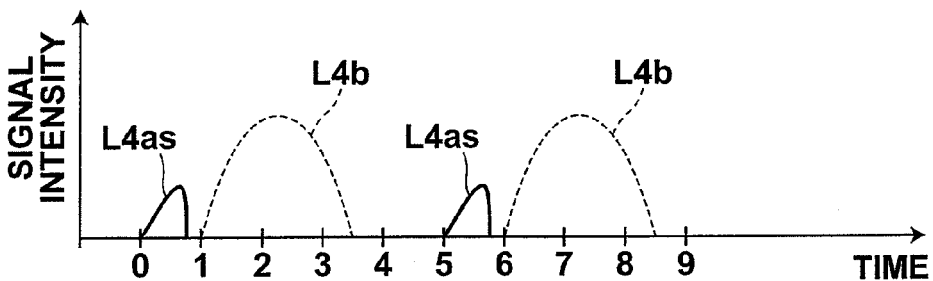

Now, the operation related to the leak reflected beams will be described with reference to FIGS. 6A to 6D. The graph shown on the left side of FIG. 6A is a graph illustrating the wavelength sweeping of the light beams La and Lb with time plotted on the horizontal axis and frequency on the vertical axis. FIG. 6B is a graph illustrating temporal changes in the intensities of the light beams La and Lb outputted from the light sources 10a and 10b respectively, in which the horizontal axis indicates the time and vertical axis indicates the beam intensity. FIG. 6C is a graph illustrating changes in the intensity of the interference beam outputted from the interference beam detection means 40a, and FIG. 6D is a graph illustrating changes in the intensity of the interference beam outputted from the interference beam detection means 40b, in which the beams are broken down to each beam in association with the time axis of FIG. 6B in order to facilitate understanding.

Further, the graph shown on the right side of FIG. 6A illustrates branching characteristics of the wavelength dividing means 5a and 5b, in which frequency is plotted on the vertical axis in association with the frequency axis of the graph on the left, and the branching ratio of the wavelength dividing means 5a and 5b is plotted on the horizontal axis. That is, light beams with wavelengths not shorter than 1310 nm are outputted to the side of the beam combining/splitting means 6a, light beams with wavelengths not longer than 1290 nm to the side of the beam combining/splitting means 6b, and light beams with wavelengths within the wavelength range from 1290 to 1310 nm are branched to the side of the beam combining/splitting means 6a at a branching ratio the varies from 0 to 100% and to the side of the beam combining/splitting means 6b at a branching ratio the varies from 100 to 0%.

As described earlier, the light source 10a sweeps the wavelength at an interval of 5 ms within the wavelength range Δλa (1295 to 1345 nm), and emits the light beam La for the first 2.5 ms and does not emit light for the remaining 2.5 ms. The light source 10b sweeps the wavelength at an interval of 5 ms within the wavelength range Δλb (1255 to 1305 nm), and emits the light beam Lb for the first 2.5 ms and does not emit light for the remaining 2.5 ms. In addition, the light source 10b initiates the sweeping of the light beam Lb 1 ms later from the initiation of the sweeping of the light beam La by the light source 10a.

The sweep wavelength range of the light beam La is Δλa (1295 to 1345 nm), and the sweep wavelength range of the light beam Lb is Δλb (1255 to 1305 nm), so that, in the wavelength dividing means 5a, most of the reflected beam L3a is outputted to the side of the beam combining/splitting means 6a, and most of the reflected beam L3b is outputted to the side of the beam combining/splitting means 6b. In the mean time, a portion of the reflected beam L3a leaks into the side of the beam combining/splitting means 6b, forming the leak reflected beam L3as, and a portion of the reflected beam L3b leaks into the side of the beam combining/splitting means 6a, forming the leak reflected beam L3bs.

In the wavelength dividing means 5b, most of the reference beam L2a is outputted to the side of the beam combining/splitting means 6a, and most of the reference beam L2b is outputted to the side of the beam combining/splitting means 6b. In the mean time, a portion of the reference beam L2a leaks into the side of the beam combining/splitting means 6b, forming the leak reference beam L2as, and a portion of the reference beam L2b leaks into the side of the beam combining/splitting means 6a, forming the leak reflected beam L2bs.

Consequently, in the beam combining/splitting means 6a, a leak interference beam L4bs is produced by the leak reflected beam L3bs and leak reference beam L2bs, as well as the interference beam L4a by the reflected beam L3a and reference beam L2a. Likewise, in the beam combining/splitting means 6b, a leak interference beam L4as is produced by the leak reflected beam L3as and leak reference beam L2as, as well as the interference beam L4b by the reflected beam L3b and reference beam L2b.

That is, the interference beam L4a and leak interference beam L4bs are inputted to the interference beam detection means 40a, and the interference beam L4b and leak interference beam L4as are inputted to the interference beam detection means 40b. In the mean time, the light beams La and Lb are swept at timings illustrated in FIG. 6A, so that the interference beam L4a and leak interference beam L4bs are inputted to the interference beam detection means 40a at different timings, as illustrated in FIG. 6C. In addition, as illustrated in FIG. 6D, the interference beam L4b and leak interference beam L4as are inputted to the interference beam detection means 40b at different timings.

Further, the tomographic image processing means 50 recognizes a detection value detected during a time period of 2.5 ms from the start of sweeping of the light source 10a for the output of the interference beam detection means 40a as the interference signal ISa, and a detection value detected during a time period of 2.5 ms from the start of sweeping of the light source 10b for the output of the interference beam detection means 40b as the interference signal ISb in synchronization with wavelength sweep start triggers of the light sources 10a and 10b. In this way, the tomographic image processing means 50 may recognize the interference signals ISa and ISb accurately.

As clear from the above description, in the present embodiment, while light beams with wavelengths in such a wavelength range as to be branched into two directions by the wavelength dividing means 5a and 5b (1290 to 1310 nm) are outputted from the light source 10a, light beams are outputted only from the light source 10a, and while light beams with wavelengths in the wavelength range described above (1290 to 1310 nm) are outputted from the light source 10b, light beams are outputted only from the light source 10b. Therefore, while the interference beam L4a is detected by the interference beam detection means 40a, the leak interference beam L4bs is not detected by the interference beam detection means 40a, and while the interference beam L4b is detected by the interference beam detection means 40b, the leak interference beam L4as is not detected by the interference beam detection means 40b. Thus, the interference beams L4a and L4b may be detected accurately. Further, while light beams with wavelengths not shorter than 1310 nm are outputted from the light source 10a, and light beams with wavelengths not longer than 1290 nm are outputted from the light source 10b, the wavelengths of the light beams outputted from the respective light sources are divided by the wavelength dividing means 5a and 5b respectively, and the respective interference beams are detected by the interference beam detection means 40a and 40b respectively. Consequently, even if a plurality of light beams having different wavelengths is irradiated onto the measuring object S at the same time, a plurality of interference signals obtained from a plurality of interference beams produced at that time is not mixed up, and the plurality of interference signals with respect to each light beam are obtained at the same time. This may increase the measuring rate in comparison with the past. Accordingly, interference signals extending over a broadband and continuous spectrum may be obtained, and a higher resolution tomographic image may be obtained rapidly.

Further, in the conventional tomographic imaging apparatus having a plurality of light sources or a plurality of gain media, synchronization control is required such that only a single wavelength is inputted to the detector. But the tomographic imaging apparatus of the present invention does not require such control, so that the apparatus may be simplified. Still further, in the tomographic imaging apparatus of the present invention, each of the interference beam detection means may be structured optimally according to the wavelength ranges of the divided wavelengths, so that the detection accuracy of each of the interference beam detection means may be improved and the resolution of a tomographic image to be obtained may be increased. Further, component parts used in the interference beam detection means need only to cover each wavelength range of the divided wavelength and not to cover a broadband light beam. This may relax the restrictions on the component parts to be used in comparison with the past and allow the use of general purpose component parts, so that the apparatus may be constructed easily.

Still further, portions of the wavelength range $\Delta\lambda a$ (1295 to 1345 nm) of the laser beam La outputted from the light source 10a and the wavelength range $\Delta\lambda b$ (1255 to 1305 nm) of the laser beam Lb outputted from the light source 10b are overlapping with each other. This allows the single interference signal ISO to be formed by integrating the interference signals ISa and ISb, and a tomographic image to be generated based on the interference signal ISO, so that a higher resolution image may be obtained.

Next, the optical tomographic imaging apparatus 200 according to a second embodiment of the present invention will be described with reference to FIG. 7 and FIGS. 8A to 8D. FIG. 7 is a schematic configuration diagram of the optical tomographic imaging apparatus 200. The optical tomographic imaging apparatus 200 differs from the optical tomographic imaging apparatus 100 shown in FIG. 1 in the structure of the light source unit 20, and the structure of the interference beam detection means 40a and 40b. Hereinafter, the description will be made for only the differences, and in the optical tomographic imaging apparatus 200 shown in FIG. 7, components identical to those of the optical tomographic imaging apparatus 100 shown in FIG. 1 are given the same reference symbols and will not be elaborated upon further here.

Figure 8A:
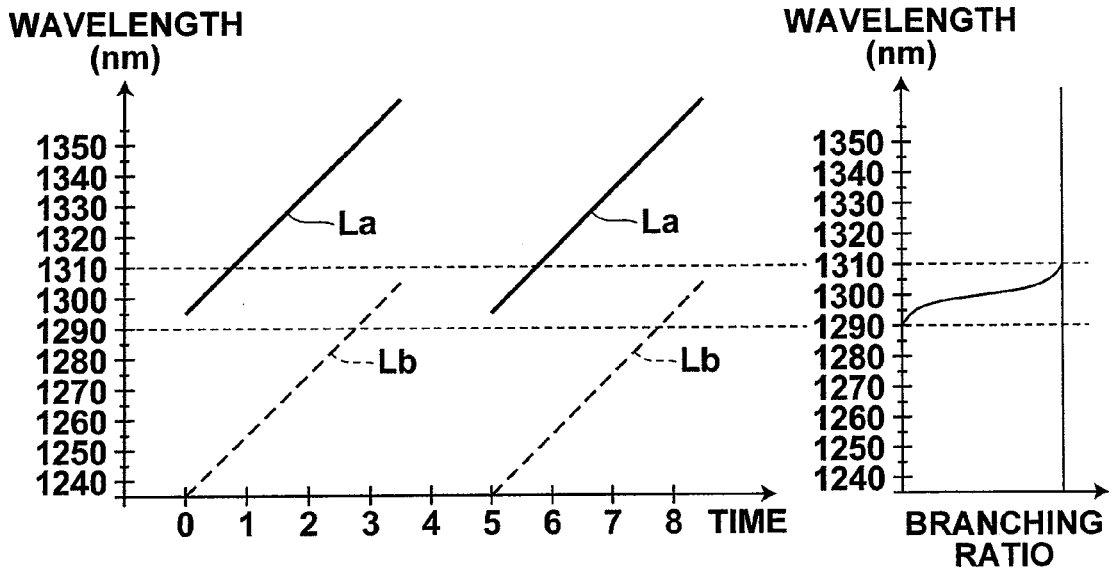
FIGS. 8A to 8D illustrate an operation of the second embodiment of the present invention.

Wavelength sweeps of light sources 20a and 20b of the light source 20 are shown in FIG. 8A. The light source 20a includes a wavelength selection means 21a, and sweeps the wavelength at an interval of 5 ms within a wavelength range $\Delta\lambda a$ (1295 to 1365 nm). It is noted that the light source 20a emits a light beam La for the first 3.5 ms and does not emit light for the remaining 1.5 ms. The light source 20b includes a wavelength selection means 21b, and sweeps the wavelength at an interval of 5 ms within a wavelength range Δλb (1235 to 1305 nm). It is also noted that the light source 20b emits a light beam Lb for the first 3.5 ms and does not emit light for the remaining 1.5 ms. In addition, the sweeping of the light beam La in the light source 20a and the sweeping of the light beam Lb in the light source 20b are initiated at the same time.

Figure 8B:
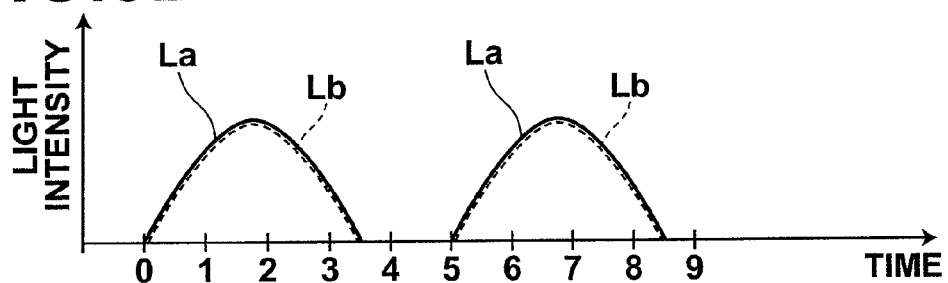
Figure 8C:
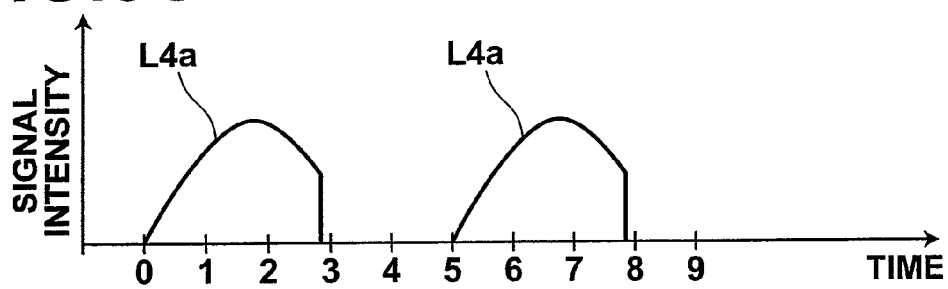
Figure 8D:
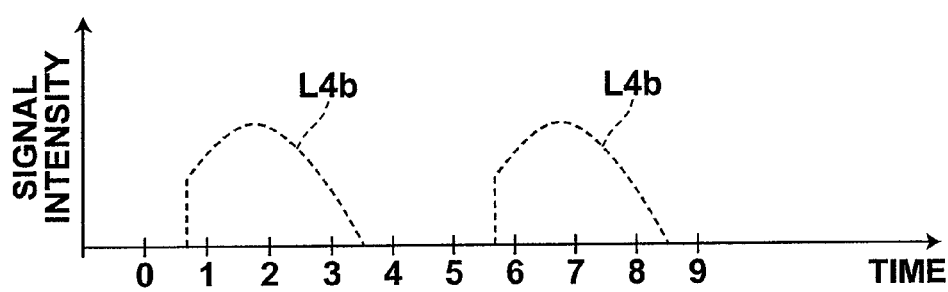

The interference beam detection means 41a outputs only the detection result detected during a time period of 2.75 ms from the start of the sweeping to the tomographic image processing means 50 in synchronization with a wavelength sweep start trigger, and discards the detection result detected in the remaining time period. FIG. 8B is a graph illustrating temporal changes in the intensities of the light beams La and Lb outputted from the light sources 20a and 20b respectively, in which the horizontal axis indicates the time and vertical axis indicates the beam intensity. FIG. 8C is a graph illustrating changes in the intensity of the interference beam outputted from the interference beam detection means 41a, and FIG. 8D is a graph illustrating changes in the intensity of the interference beam outputted from the interference beam detection means 41b, in which the beams are broken down to each beam in association with the time axis of FIG. 8B in order to facilitate understanding.

As in the optical tomographic imaging apparatus 100 shown in FIG. 1, the leak interference beam L4bs is inputted to the interference beam detection means 41a, as well as the interference beam L4a, during a time period from 2.75 ms to 3.5 ms after the start of the sweeping (FIG. 6C), but the output during this time period is discarded. That is, while light beams with wavelengths in such a wavelength range as to be branched into two directions by the wavelength dividing means 5a and 5b (1290 to 1310 nm) are outputted from the light source 20a, the detection result of the interference beam detection means 41b is discarded, and while light beams with wavelengths in the wavelength range described above (1290 to 1310 nm) are outputted from the light source 20b, the detection result of the interference beam detection means 41a is discarded.

The tomographic image processing means 50 recognizes the signal inputted from the interference beam detection means 41a as the interference signal ISa and the signal inputted from the interference beam detection means 41b as the interference signal ISb, and generates a tomographic image.

That is, while light beams with wavelengths in such a wavelength range as to be branched into two directions by the wavelength dividing means 5a and 5b (1290 to 1310 nm) are outputted from either the light sources 20a or the light source 20b, only the interference signal based on the light beam outputted from either one of the light sources is detected, so that the leak interference beams are not detected and the interference beams L4a and L4b may be detected accurately.

Next, the optical tomographic imaging apparatus 250 according to a third embodiment of the present invention will be described with reference to FIGS. 7 and FIGS. 9A to 9C. The optical tomographic imaging apparatus 250 differs from the optical tomographic imaging apparatus 200 shown in FIG. 7 only in the structure of interference beam detection means 40a and 40b, and the structure of a tomographic image processing means 55. Thus, FIG. 7 also illustrates the schematic configuration of the tomographic imaging apparatus 250 in which the interference beam detection means 40a and 40b and tomographic image processing means 55 are indicated by reference symbols in parentheses. Hereinafter, the description will be made for only the differences, and in the optical tomographic imaging apparatus 250, components identical to those of the optical tomographic imaging apparatus 200 will not be elaborated upon further here.

The interference beam detection means 40a and 40b have identical structures to those used in the optical tomographic imaging apparatus 100 shown in FIG. 1.

The tomographic image processing mean 55 recognizes, for the output of the interference beam detection means 40a, only a detection result during a time period of 2.75 ms from the start of the sweeping as the interference signal ISa and, for the output of the interference beam detection means 40b, only a detection result during a time period of 0.75 ms to 3.5 ms after the start of the sweeping as the interference signal ISb, in synchronization with a wavelength sweep start trigger, and generates a tomographic image.

Figure 9A:
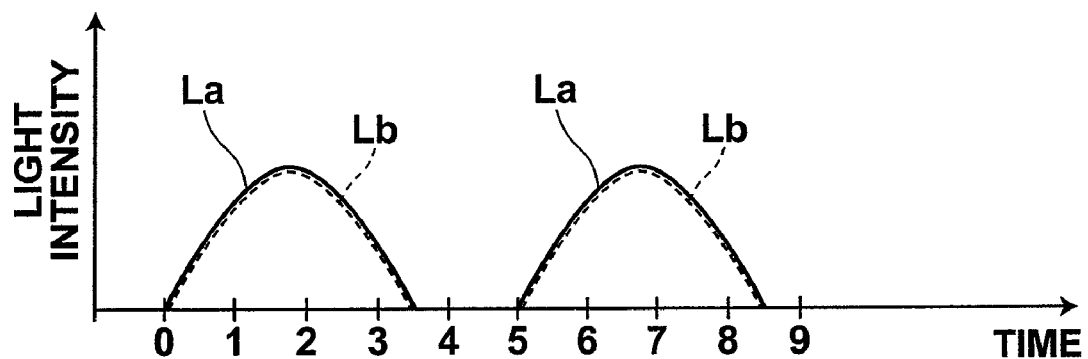
FIGS. 9A to 9C illustrate an operation of the third embodiment of the present invention.
Figure 9B:
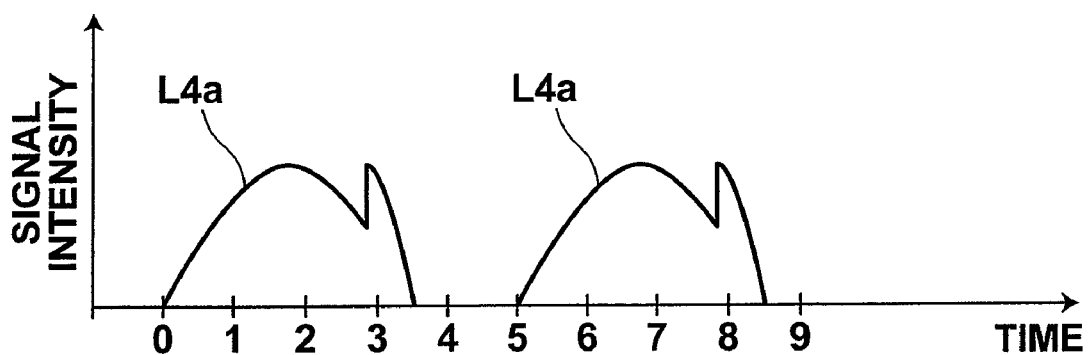

FIG. 9A is a graph illustrating temporal changes in the intensities of the light beams La and Lb outputted from the light sources 20a and 20b respectively, in which the horizontal axis indicates the time and vertical axis indicates the beam intensity. FIG. 9B is a graph illustrating changes in the intensity of the interference beam outputted from the interference beam detection means 40a, and FIG. 9C is a graph illustrating changes in the intensity of the interference beam outputted from the interference beam detection means 40b, in which the beams are broken down to each beam in association with the time axis of FIG. 9A in order to facilitate understanding.

Figure 9C:
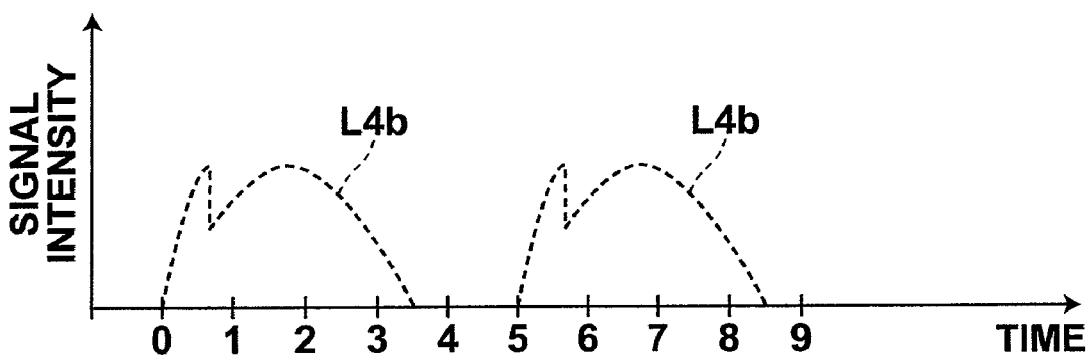

As clear from FIGS. 9A to 9C, the leak interference beam L4bs is inputted to the interference beam detection means 40a, as well as the interference beam L4a, during a time period from 2.75 ms to 3.5 ms after the start of the sweeping, and the leak interference beam L4as is inputted to the interference beam detection means 40b, as well as the interference beam L4b, during a time period of 0.75 ms from the start of the sweeping. But the signals during these time periods are not recognized as the interference signals by the tomographic image processing means 55. That is, while light beams with wavelengths in such a wavelength range as to be branched into two directions by the wavelength dividing means 5a and 5b (1290 to 1310 nm) are outputted from the light source 20a, the tomographic image processing means 55 recognizes only an interference signal based on the light beam outputted from the light source 20a as the interference signal, and while light beams with wavelengths in the wavelength range described above (1290 to 1310 nm) are outputted from the light source 20b, it recognizes only an interference signal based on the light beam outputted from the light source 20b as the interference signal.

That is, while light beams with wavelengths in such a wavelength range as to be branched into two directions by the wavelength dividing means 5a and 5b (1290 to 1310 nm) are outputted from either the light sources 20a or the light source 20b, the tomographic image processing means 55 uses only the interference signal based on the light beam outputted from either one of the light sources, so that the interference signals ISa and ISb may be recognized accurately without influenced by the leak interference beams.

Next, the optical tomographic imaging apparatus 300 according to a fourth embodiment of the present invention will be described with reference to FIG. 10. FIG. 10 is a schematic configuration diagram of the optical tomographic imaging apparatus 300. The optical tomographic imaging apparatus 300 is a SS-OCT system using a Mach-Zehnder interferometer. Basically, optical tomographic imaging apparatus 300 differs from the optical tomographic imaging apparatus 100 shown in FIG. 1 in that it includes beam splitting means 3a and 3b, and wavelength dividing means 5, instead of the beam splitting means 3, and wavelength dividing means 5a and 5b. Hereinafter, the description will be made for only the differences, and in the optical tomographic imaging apparatus 300 shown in FIG. 10, components identical to those of the optical tomographic imaging apparatus 100 shown in FIG. 1 are given the same reference symbols and will not be elaborated upon further here.

The optical tomographic imaging apparatus 300 includes: a light source unit 10 having a light source 10a that outputs a light beam La which is repeatedly swept in wavelength within a wavelength range Δλa (1000 to 1100 nm) and a light source 10b that outputs a light beam Lb which is repeatedly swept in wavelength within a wavelength range Δλb (900 to 1020 nm); a beam splitting means 3a and 3b that split the light beams La and Lb outputted from the light source unit 10 into a measuring beam L1a and a reference beam L2a, and a measuring beam L1b and a reference beam L2b respectively; a wavelength dividing means 5 that combines the measuring beams L1a and L1b, and divides the wavelength of reflected beam from a measuring object S when the combined measuring beams L1a and L1b are irradiated onto the measuring object S into reflected beams L3a and L3b, beam combining means 6a and 6b that combine the reflected beams L3a and L3b with the reference beams L2a and L2b respectively; a plurality of interference beam detection means 40a and 40b that detect an interference beam L4a produced when the reflected beam L3a is combined with the reference beam L2a by the beam combining means 6a as an interference signal ISa, and an interference beam L4b produced when the reflected beam L3b is combined with the reference beam L2b by the beam combining means 6b as an interference signal ISb; and a tomographic image processing means 50 that obtains a tomographic image of the measuring object S using the interference signals ISa and ISb detected by the interference beam detection means 40a and 40b.

It is noted that the measuring beam L1a, reference beam L2a, reflected beam L3a, and interference beam L4a are the light beams based on the light beam La and in the same wavelength range as that of the light beam La. Likewise, the measuring beam L1b, reference beam L2b, reflected beam L3a, and interference beam L4a are the light beams based on the light beam Lb and in the same wavelength range as that of the light beam Lb.

From the light source 10a of the light source unit 10, a laser beam La which is repeatedly swept in the wavelength within the wavelength range Δλa (1000 to 1100 nm) is outputted, and from the light source 10b of the light source unit 10, a laser beam Lb which is repeatedly swept in the wavelength within the wavelength range Δλb (900 to 1020 nm) is outputted. Each of the semiconductor optical amplifiers 11a and 11b is formed of, for example, an InGaAs/AlGaAs device. The light source 10a sweeps the wavelength at an interval of 5 ms within the wavelength range Δλa (1000 to 1100 nm). It is noted that the light source 10a emits the light beam La for the first 2.5 ms and does not emit light for the remaining 2.5 ms. The light source 10b sweeps the wavelength at an interval of 5 ms within the wavelength range Δλb (900 to 1020 nm). It is noted that the light source 10b emits the light beam Lb for the first 2.5 ms and does not emit light for the remaining 2.5 ms. In addition, the sweeping of the light beam Lb in the light source 10b is initiated 1 ms later from the initiation of the sweeping of the light beam La in the light source 10a.

Each of the beam splitting means 3a, and 3b includes, for example, a 2×2 optical coupler with a branching ratio of 90:10. The beam splitting means 3a splits the light beam La into the measuring beam L1a and reference beam L2a, and the beam splitting means 3b splits the light beam Lb into the measuring beam L1b and reference beam L2b. Here, the beam splitting means 3a and 3b split the respective light beams into the respective measuring and reference beams at a ratio of 90:10.

The wavelength dividing means 5 is provided in the optical paths between the beam splitting means 3a and a probe 30 and between the beam splitting means 3b and the probe 30.

The wavelength dividing means 5 has a function to divide the wavelength of a light beam according to a predetermined wavelength, and is formed of, for example, a WDM (Wavelength Division Multiplexing) coupler. The wavelength dividing means 5 combines the measuring beams L1a and L1b inputted from the light splitting means 3a and 3b respectively and outputs to the probe 30. Further, the wavelength dividing means 5 outputs light beams inputted from the probe 30 having wavelengths not shorter than 1020 nm to the circulator 4a side and light beams inputted from the probe 30 having wavelengths not longer than 1000 nm are outputted the circulator 4b side. In addition, it outputs light beams with wavelengths within the wavelength range from 1000 to 1020 nm to both sides. More specifically, light beams within the wavelength range from 1000 to 1020 nm are branched to the circulator 4a side at a branching ratio that varies approximately from 0 to 100%, and to the circulator 4b side at a branching ratio that varies approximately from 100 to 0%. Accordingly, most of the reflected beam L3a is outputted to the circulator 4a side, and most of the reflected beam L3b is outputted to the circulator 4b side. In the mean time, a portion of the reflected beam L3a (portion of light beams within the wavelength range from 1000 to 1020 nm) is outputted to the circulator 4b side, forming a leak reflected beam L3as), and a portion of the reflected beam L3b (portion of light beams within the wavelength range from 1000 to 1020 nm) is outputted to the circulator 4a side, forming a leak reflected beam L3bs.

The reflected beam L3a is combined with the reference beam L2a by the beam combining means 6a, and the reflected beam L3b is combined with the reference beam L2b by the beam combining means 6b. A transmission type optical path length control means 7a is provided in the optical path of the reference beams L2a between the beam splitting means 3a and the beam combining means 6a and a transmission type optical path length control means 7b is provided in the optical path of the reference beams L2b between the beam splitting means 3b and the beam combining means 6b. The optical path length control means 7a and 7b change the optical path lengths of the reference beams L2a and L2b respectively to control the starting position for obtaining a tomographic image.

The interference beam detection means 40a and 40b have functions to perform photoelectrical conversions on the interference beams L4a and L4b respectively to detect them as a plurality of interference signals ISa and ISb with respect to the wavelength ranges Δλa and Δλb of the light beams La and Lb. The interference beam detection means 40a is formed of a Si device, and the interference beam detection means 40b is formed of an InGaAs device.

Next, an example operation of the optical tomographic imaging apparatus 300 will be described. The light beam La, swept in wavelength within the wavelength range Δλa (1000 to 1100 nm) is outputted from the light source 10a, which is guided through the optical fiber FB1a and inputted to the beam splitting means 3a. In the beam splitting means 3a, the light beam La is split into the measuring beam L1a and reference beam L2a, and the measuring beam L1a is outputted to the optical fiber FB2a, and the reference beam L2a is outputted to the optical fiber FB3a. The measuring beam L1a is guided through the optical fiber FB2a to the circulator 4a, then after the circulator 4a guided through the optical fiber FB4a, and inputted to the wavelength dividing means 5.

In the mean time, from the light source 10b, the light beam Lb, swept in wavelength within the wavelength range Δλa (900 to 1020 nm) is outputted, which is guided through the optical fiber FB1b and inputted to the beam splitting means 3b. In the beam splitting means 3b, the light beam Lb is split into the measuring beam L1b and reference beam L2b, and the measuring beam L1b is outputted to the optical fiber FB2b, and the reference beam L2b is outputted to the optical fiber FB3b. The measuring beam L1b is guided through the optical fiber FB2b to the circulator 4b, then after the circulator 4b guided through the optical fiber FB4b, and inputted to the wavelength dividing means 5.

In the wavelength dividing means 5, the measuring beams L1a and L1b are combined together, then guided through the optical fiber FB5, and inputted to the probe 30 through the optical rotary connector 31. The combined measuring beams L1a and L1b are then guided through the probe 30 and irradiated onto the measuring object S. Then, the reflected beams L3a and L3b from the measuring object S at each depth position "z" are inputted to the probe 30, propagated through the reverse path of the measuring beams, and inputted to the wavelength dividing means 5.

In the wavelength dividing means 5, most of the reflected beam L3a is outputted to the circulator 4a side, and most of the reflected beam L3b is outputted to the circulator 4b side.

The reflected beam L3a guided by the optical fiber FB4a is inputted to the beam combining means 6a guided by the optical fiber FB6a after the circulator 4a. In the mean time, the reference beam L2a split by the beam splitting mean 3a is inputted to the beam combining means 6a after the optical path length thereof is controlled by the optical path length control means 7a provided in the middle of the optical fiber FB3a.

In the beam combining means 6a, the reflected beam L3a and reference beam L2a are combined together, and an interference beam L4a produced by the beam combining is divided into halves and outputted to the interference detection means 40a. In the interference detection means 40a, the interference beam L4a is detected through balanced detection and photoelectrically converted, thereby an interference signal ISa is generated and outputted to the tomographic image processing means 50.

Likewise, the reflected beam L3b guided by the optical fiber FB4b is inputted to the beam combining means 6b guided by the optical fiber FB6b after the circulator 4b. In the mean time, the reference beam L2b split by the beam splitting mean 3b is inputted to the beam combining means 6b after the optical path length thereof is controlled by the optical path length control means 7b provided in the middle of the optical fiber FB3a.

In the beam combining means 6b, the reflected beam L3b and reference beam L2b are combined together, and an interference beam L4b produced by the beam combining is divided into halves and outputted to the interference detection means 40b. In the interference detection means 40b, the interference beam L4b is detected through balanced detection and photoelectrically converted, thereby an interference signal ISb is generated and outputted to the tomographic image processing means 50. The structure and operation of the tomographic image processing means 50 are identical to those of the first embodiment, so that they will not be elaborated upon further here.

Hereinafter, an operation related to leak reflected beams will be described. As described earlier, the light source 10a sweeps the wavelength at an interval of 5 ms within the wavelength range Δλa (1000 to 1100 nm), and emits the light beam La for the first 2.5 ms and does not emit light for the remaining 2.5 ms. The light source 10b sweeps the wavelength at an interval of 5 ms within the wavelength range Δλb (900 to 1020 nm), and emits the light beam Lb for the first 2.5 ms and does not emit light for the remaining 2.5 ms. In addition, the light source 10b initiates the sweeping of the light beam Lb 1 ms later from the initiation of the sweeping of the light beam La by the light source 10a.

The sweep wavelength range of the light beam La is Δλa (1000 to 1100 nm), and the sweep wavelength range of the light beam Lb is Δλb (900 to 1020 nm), so that, in the wavelength dividing means 5, most of the reflected beam L3a is outputted to the circulator 4a side, and most of the reflected beam L3b is outputted to the circulator 4b side. In the mean time, a portion of the reflected beam L3a (portion of light beams in the range from 1000 to 1020 nm) leaks into the circulator 4b side, forming the leak reflected beam L3as, and a portion of the reflected beam L3b (portion of light beams in the range from 1000 to 1020 nm) leaks into the circulator 4a side, forming the leak reflected beam L3bs. That is, the interference beam L4a and leak interference beam L3bs are inputted to the interference beam detection means 40a, and the interference beam L4b and leak interference beam L3as are inputted to the interference beam detection means 40b. In the mean time, the wavelength sweeping of the light beam Lb is initiated 1 ms later from the initiation of the wavelength sweeping of the light beam La, so that the leak interference beam L3bs is not detected by the interference beam detection means 40a while the interference beam L4a is detected by the interference beam detection means 40a. Further, the leak interference beam L3as is not detected by the interference beam detection means 40b while the interference beam L4b is detected by the interference beam detection means 40b. Accordingly, the interference beams L4a and L4b may be detected accurately.

Figure 11:
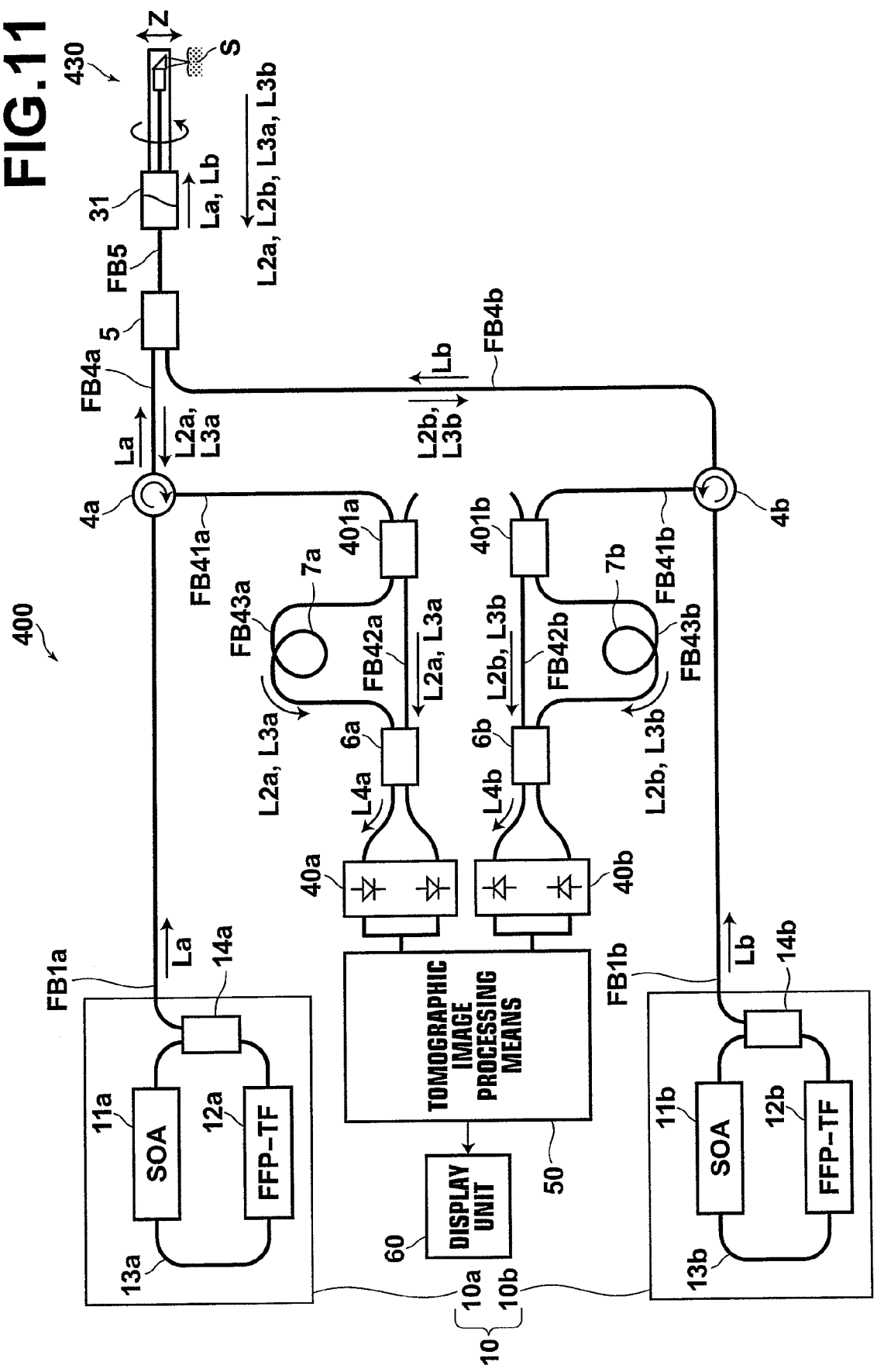
FIG. 11 is a schematic configuration diagram of the optical tomographic imaging apparatus according to a fifth embodiment of the present invention.

Next, the optical tomographic imaging apparatus 400 according to a fifth embodiment of the present invention will be described with reference to FIGS. 11 and 12. FIG. 11 is a schematic configuration diagram of the optical tomographic imaging apparatus 400. The optical tomographic imaging apparatus 300 is a SS-OCT system using a Fizeau interferometer, which is characterized by the use of a probe 430 that differs from the probe 30 of the optical tomographic imaging apparatus 100 shown in FIG. 1. Hereinafter, the description will be made for only the differences, and in the optical tomographic imaging apparatus 400 shown in FIG. 11, components identical to those of the optical tomographic imaging apparatuses in the previous embodiments are given the same reference symbols and will not be elaborated upon further here.

Figure 12:
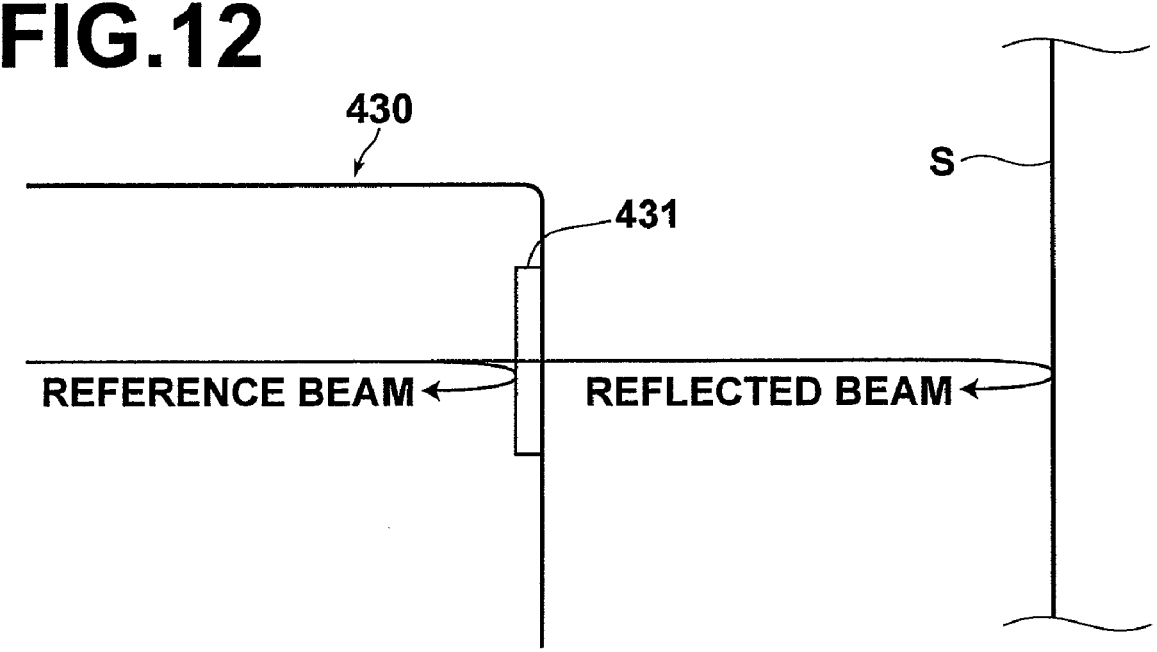
FIG. 12 is a drawing for explaining a Fizeau interferometer.

The probe 430 includes a beam splitting means 431 at the output end on the side of the measuring object S, as illustrated in FIG. 12. The beam splitting means 431 is structured to transmit a portion of a light beam from the light source unit 10, which is used as a measuring beam, and to reflect the remaining portion of the light beam, which is used as a reference beam. In an example shown in FIG. 12, a half-mirror is used as the beam splitting means 431, but a reflection coating may be applied to the output face of the probe 430 that reflects a portion of an inputted light beam instead of using the half mirror. Alternatively, an arrangement may be adopted in which the output face of the probe 430 is made orthogonal to the optical axis of the inputted light beam and optically polished to form an optical flat surface without forming a reflection coating, and a light beam reflected due to refractive index difference between the media (e.g., glass and air) at the output face is used as the reference beam.

In the optical tomographic imaging apparatus 400, the light beam La outputted from the light source 10a and guided by the optical fiber FB1a is passed through the circulator 4a, guided through the optical fiber FB 4a, and inputted to the wavelength dividing means 5. Likewise, the light beam Lb outputted from the light source 10b and guided by the optical fiber FB1b is passed through the circulator 4b, guided through the optical fiber FB 4b, and inputted to the wavelength dividing means 5.

In the wavelength dividing means 5, the light beams La and Lb are combined together, then guided through the optical fiber FB5, and inputted to the probe 430 through the optical rotary connector 31. At the beam splitting means 431 on the output end of the probe 430, a portion of the combined light beams La and Lb is transmitted to serve as the measuring beams L1a and L1b, and the remaining portion thereof is reflected to serve as the reference beams L2a and L2b. The measuring beams L1a and L1b are irradiated onto the measuring object S, and reflected beams L3a and L3b reflected at that time are guided through the probe 430 and optical fiber FB5, and inputted to the wavelength dividing means 5. The reference beams L2a and L2b reflected by the beam splitting means 431 are also guided through the 430 and optical fiber FB5, and inputted to the wavelength dividing means 5.

The reflected beams L3a, L3b, and reference beams L2a, L2b inputted to the wavelength dividing means 5 are divided according to the wavelength range, and the reflected beam L3a and reference beam L2a are outputted to the optical fiber FB4a, while the reflected beam L3b and reference beam L2b are outputted to the optical fiber FB4b.

Thereafter, the reflected beam L3a and reference beam L2a are passed through the circulator 4a, guided through an optical fiber FB41a, and inputted to a beam splitting means 401a. The beam splitting means 401a is formed of, for example, a 2×2 optical coupler with a branching ratio of 50:50. Approximately 50% of each of the reflected beam L3a and reference beam L2a inputted to the beam splitting means 401a is outputted to an optical fiber FB42a, guided thereby, and inputted to the beam combining means 6a. The remaining approximately 50% of each of the reflected beam L3a and reference beam L2a inputted to the beam splitting means 401a is outputted to an optical fiber FB43a and inputted to the beam combining means 6a after the optical path length thereof is controlled by the optical path length control means 7a provided in the middle of the optical fiber FB43a.

In the beam combining means 6a, the reference beam L2a guided by the optical fiber FB42a and the reflected beam L3a guided by the optical fiber FB43a, or the reflected beam L3a guided by the optical fiber FB42a and the reference beam L2a guided by the optical fiber FB43a interfere with each other, thereby an interference beam L4a is produced. The produced interference beam L4a is divided into halves and outputted to the interference beam detection means 40a.

Likewise, the reflected beam L3b and reference beam L2b outputted to the optical fiber FB4b are passed through the circulator 4b, guided through an optical fiber FB41b, and inputted to a beam splitting means 401b. The beam splitting means 401b is formed of, for example, a 2×2 optical coupler with a branching ratio of 50:50. Approximately 50% of each of the reflected beam L3b and reference beam L2b inputted to the beam splitting means 401b is outputted to an optical fiber FB42b, guided thereby, and inputted to the beam combining means 6b. The remaining approximately 50% of each of the reflected beam L3b and reference beam L2b inputted to the beam splitting means 401b is outputted to an optical fiber FB43b and inputted to the beam combining means 6b after the optical path length thereof is controlled by the optical path length control means 7b provided in the middle of the optical fiber FB43b.

In the beam combining means 6b, the reference beam L2b guided by the optical fiber FB42b and the reflected beam L3b guided by the optical fiber FB43b, or the reflected beam L3b guided by the optical fiber FB42b and the reference beam L2b guided by the optical fiber FB43b interfere with each other, thereby an interference beam L4b is produced. The produced interference beam L4b is divided into halves and outputted to the interference beam detection means 40b.

The structures and operations of the following interference detection means 40a and 40b, and tomographic image processing means 50 are identical to those of the first embodiment, so that they will not be elaborated upon further here.

Figure 13:
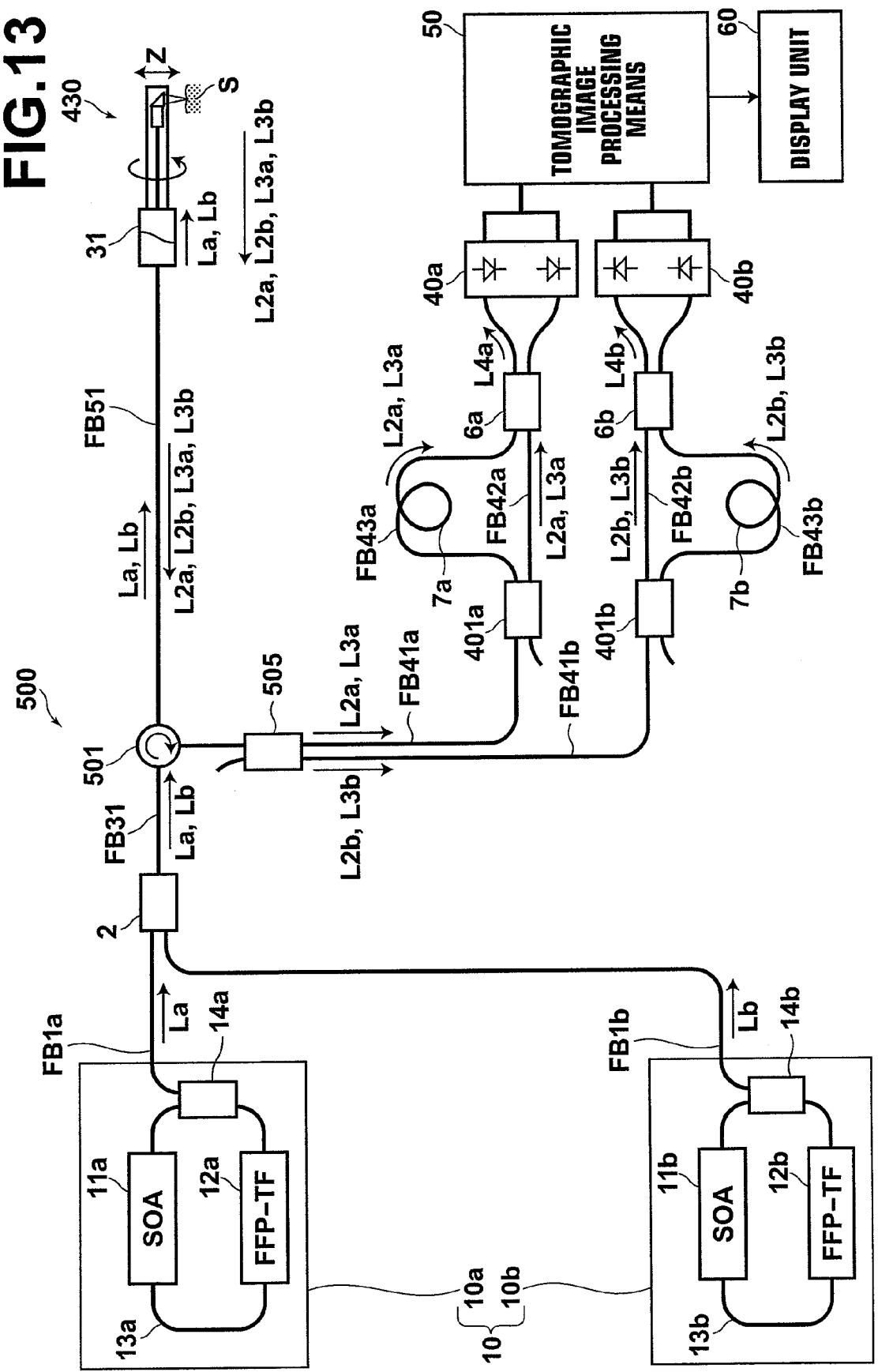
FIG. 13 is a schematic configuration diagram of the optical tomographic imaging apparatus according to a sixth embodiment of the present invention.

Next, the optical tomographic imaging apparatus 500 according to a sixth embodiment of the present invention will be described with reference to FIG. 13. FIG. 13 is a schematic configuration diagram of the optical tomographic imaging apparatus 500. The optical tomographic imaging apparatus 500 is a SS-OCT system using a Fizeau interferometer. Basically, the optical tomographic imaging apparatus 500 differs from the optical tomographic imaging apparatus 400 shown in FIG. 11 in that it includes a beam combining means 2 and a wavelength dividing means 505 instead of the wavelength dividing means 5. Hereinafter, the description will be made for only the differences, and in the optical tomographic imaging apparatus 500 shown in FIG. 13, components identical to those of the optical tomographic imaging apparatuses in the previous embodiments are given the same reference symbols and will not be elaborated upon further here.

In the optical tomographic imaging apparatus 500, the light beam La outputted from the light source 10a and guided by the optical fiber FB1a, and the light beam Lb outputted from the light source 10b and guided by the optical fiber FB1b are inputted to the beam combining means 2, and therein combined together. The combined light beams La and Lb are guided through an optical fiber FB31, passed through a circulator 501, guided through an optical fiber FB 51, and inputted to the probe 430 through the optical rotary connector 31. At the beam splitting means 431 on the output end of the probe 430, the light beams La and Lb are split into the measuring beams L1a and L1b, and the reference beams L2a and L2b respectively. The measuring beams L1a and L1b are irradiated onto the measuring object S and reflected beams L3a and L3b are obtained. The reflected beams L3a and L3b, and the reference beams L2a and L2b are guided through the optical fiber FB51, passed through the circulator 501, and inputted to the wavelength dividing means 505.

The wavelength dividing means 505 has the identical function to that of the wavelength dividing means 5 of the optical tomographic imaging apparatus 300 shown in FIG. 10, and is formed of, for example, a WDM coupler. Most of the reflected beam L3a and most of the reference beam L2a inputted to the wavelength dividing means 505 are outputted to the optical fiber FB41a. Most of the reflected beam L3b and most of the reference beam L2b inputted to the wavelength dividing means 505 are outputted to the optical fiber FB41b. The optical fiber FB41a is coupled to the beam splitting means 401a, and optical fiber FB41b is coupled to the beam splitting means 401b. The operation of the apparatus from the beam splitting means 401a and 401b onward is identical to that of the apparatus according to the fourth embodiment, so that it will be elaborated upon further here.

In the optical tomographic imaging apparatus 500, interferometers are disposed downstream of the wavelength dividing means 505 to split the beams with respect to each wavelength range before being interfered. As an alternative embodiment, a configuration may be adopted in which the beams are split with respect to each wavelength range after being interfered, and guided to the interference beam detection means.

Figure 14:
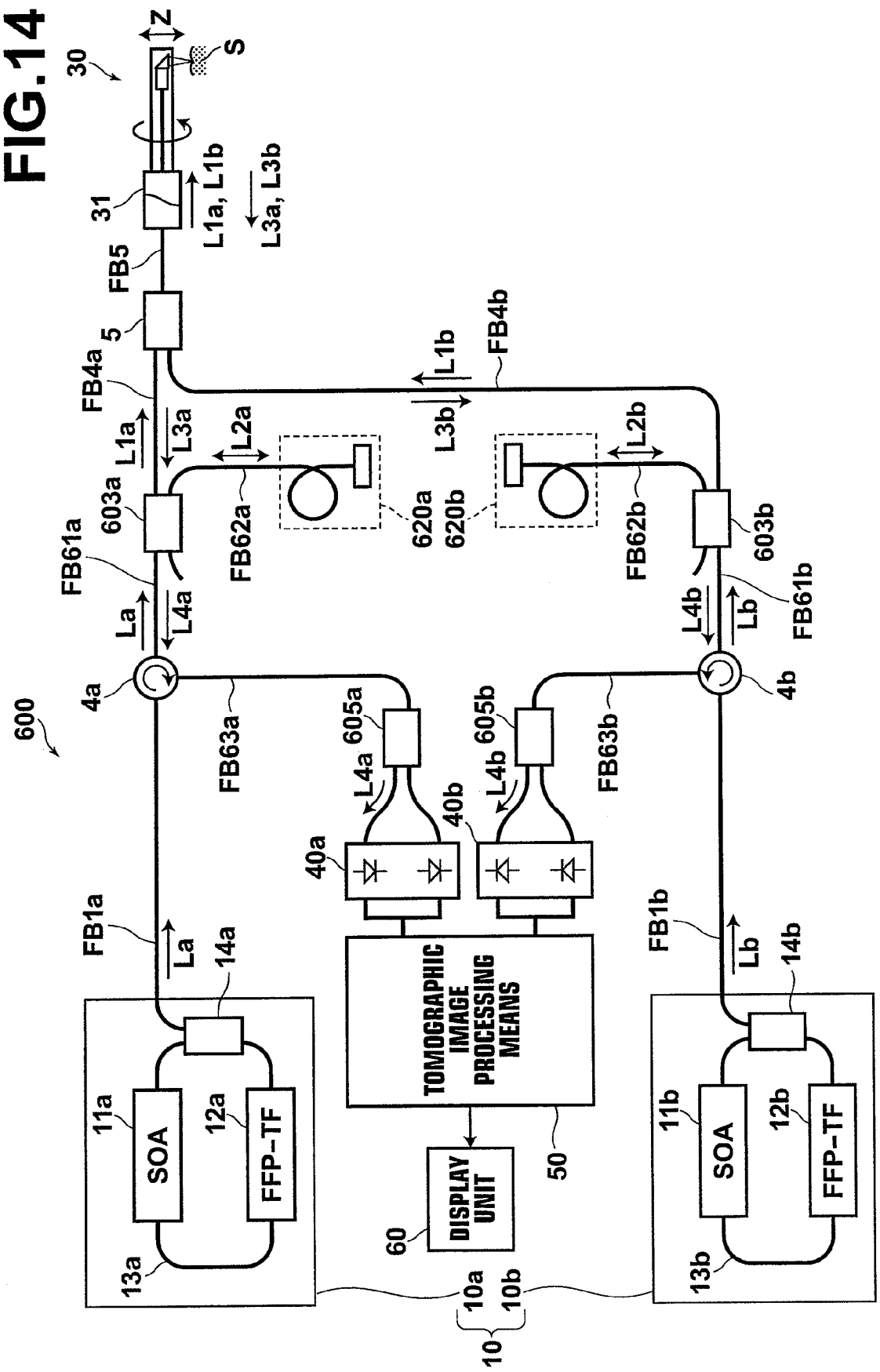
FIG. 14 is a schematic configuration diagram of the optical tomographic imaging apparatus according to a seventh embodiment of the present invention.

Next, the optical tomographic imaging apparatus 600 according to a seventh embodiment of the present invention will be described with reference to FIG. 14. FIG. 14 is a schematic configuration diagram of the optical tomographic imaging apparatus 600. The optical tomographic imaging apparatus 600 is a SS-OCT system using a Michelson interferometer. In the optical tomographic imaging apparatus 600 shown in FIG. 14, components identical to those of the optical tomographic imaging apparatuses in the previous embodiments are given the same reference symbols and will not be elaborated upon further here.

In the optical tomographic imaging apparatus 600, the light beam La outputted from the light source 10*a* and guided by the optical fiber FB1*a* is passed through the circulator 4*a*, guided by an optical fiber FB 61*a* and inputted to a beam splitting means 603*a*. The beam splitting means 603*a* is formed of, for example, a 2×2 optical coupler with a branching ratio of 90:10. It is noted that the beam splitting means 603*a* of the present embodiment functions also as a beam combining means. The beam splitting means 603*a* splits the light beam La into the measuring beam L1*a* and reference beam L2*a* at a ratio of 90:10, and outputs the measuring beam L1*a* to the optical fiber FB4*a* and reference beam L2*a* to an optical fiber FB62*a*. The measuring beam L1*a* guided by the optical fiber FB4*a* is inputted to the wavelength dividing means 5.

The light beam Lb outputted from the light source 10*b* and guided by the optical fiber FB1*b* is passed through the circulator 4*b*, guided by an optical fiber FB 61*b* and inputted to a beam splitting means 603*b*. The beam splitting means 603*b* is formed of, for example, a 2×2 optical coupler with a branching ratio of 90:10. It is noted that the beam splitting means 603*b* of the present embodiment functions also as a beam combining means. The beam splitting means 603*b* splits the light beam Lb into the measuring beam L1*b* and reference beam L2*b* at a ratio of 90:10, and outputs the measuring beam L1*b* to the optical fiber FB4*b* and reference beam L2*b* to an optical fiber FB62*b*. The measuring beam L1*b* guided by the optical fiber FB4*b* is inputted to the wavelength dividing means 5.

In the wavelength dividing means 5, the measuring beams L1*a* and L1*b* are combined together, guided through the optical fiber FB5, and inputted to the probe 30 through the optical rotary connector 31. The combined measuring beams L1*a* and L1*b* are then guided through the probe 30 and irradiated onto the measuring object S. Reflected beams L3*a* and L3*b* from the measuring object S at that time are inputted to the probe 30, propagated through the reverse path of the measuring means and inputted to the wavelength dividing means 5. In the wavelength dividing means 5, a division is made between the reflected beams L3*a* and L3*b*, and the reflected beam L3*a* is outputted to the optical fiber FB4*a* and inputted to the beam splitting means 603*a*, while the reflected beam L3*b* is outputted to the optical fiber FB4*b* and inputted to the beam splitting means 603*b*.

In the mean time, the reference beam L2*a* is guided through the optical fiber FB62*a* to a reflection type optical path length control means 620*a* connected at the end of the optical fiber FB62*a* where the optical path length thereof is controlled, then guided again by the optical fiber FB62*a* and inputted to the beam splitting means 603*a*. Likewise, the reference beam L2*b* is guided by the optical fiber FB62*b* to a reflection type optical path length control means 620*b* connected at the end of the optical fiber FB62*b* where the optical path length thereof is controlled, then guided again by the optical fiber FB62*b* and inputted to the beam splitting means 603*b*.

In the beam splitting means 603*a*, the reflected beam L3*a* is combined with the reference beam L2*a* to produce an interference beam L4*a*. The interference beam L4*a* is guided through the optical fiber FB61*a*, passed through the circulator 4*a*, and inputted to a beam splitting means 605*a*. The beam splitting means 605*a* is formed of, for example, a 2×2 optical coupler with a branching ratio of 50:50. In the beam splitting means 605*a*, the interference beam L4*a* is divided into halves and outputted to the interference beam detection means 40*a*.

Likewise, in the beam splitting means 603*b*, the reflected beam L3*b* is combined with the reference beam L2*b* to produce an interference beam L4*b*. The interference beam L4*b* is guided through the optical fiber FB61*b*, passed through the circulator 4*b*, and inputted to a beam splitting means 605*b*. The beam splitting means 605*b* is formed of, for example, a 2×2 optical coupler with a branching ratio of 50:50. In the beam splitting means 605*b*, the interference beam L4*b* is divided into halves and outputted to the interference beam detection means 40*b*.

The structures and operations of the following interference beam detection means 40*a* and 40*b*, and tomographic image processing means 50 are identical to those of the first embodiment, so that they will be elaborated upon further here.

Figure 15:
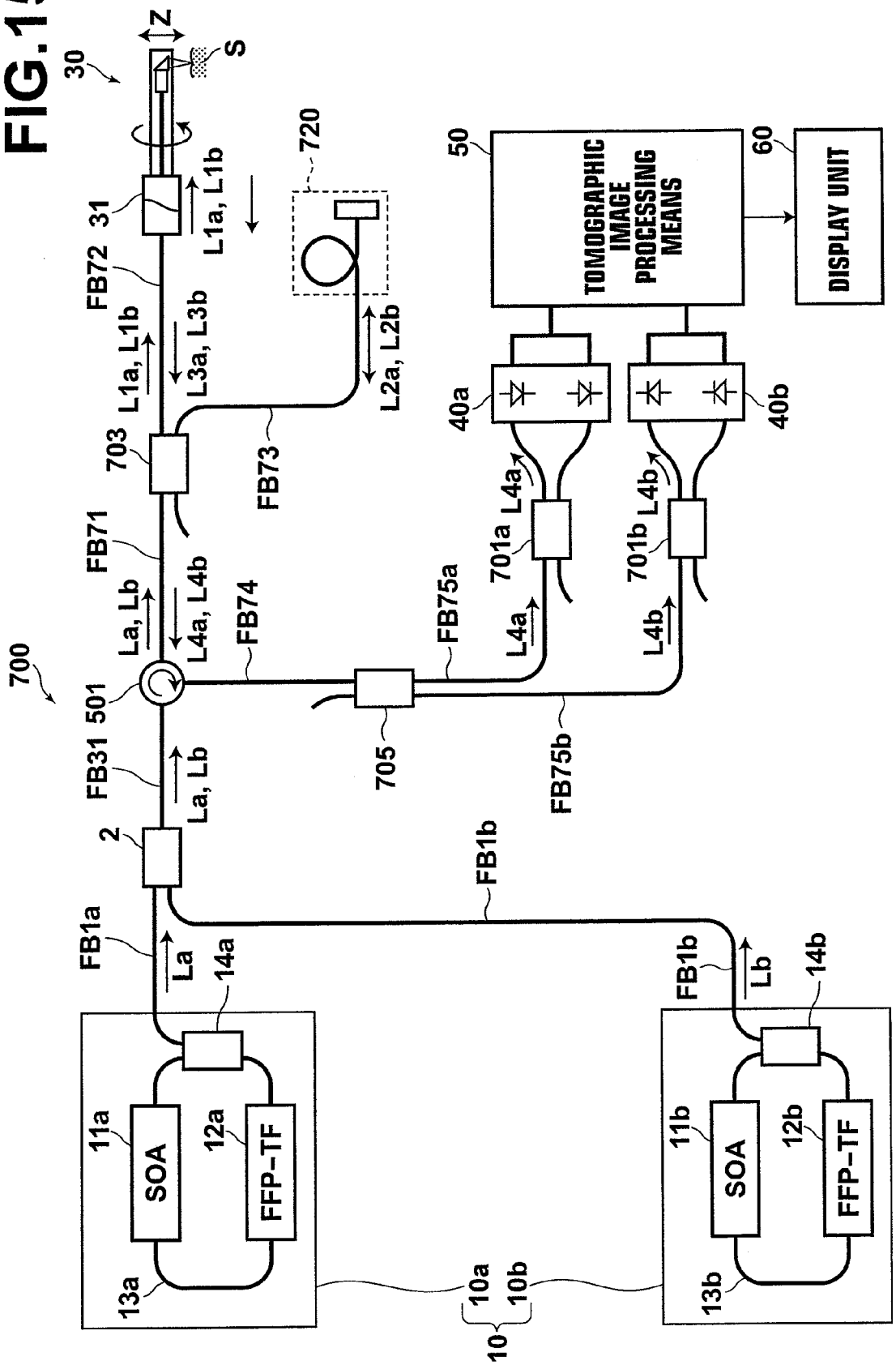
FIG. 15 is a schematic configuration diagram of the optical tomographic imaging apparatus according to an eight embodiment of the present invention.

Next, the optical tomographic imaging apparatus 700 according to an eighth embodiment of the present invention will be described with reference to FIG. 15. FIG. 15 is a schematic configuration diagram of the optical tomographic imaging apparatus 700. The optical tomographic imaging apparatus 700 is a SS-OCT system using a Michelson interferometer. Basically, the optical tomographic imaging apparatus 700 differs from the optical tomographic imaging apparatus 600 shown in FIG. 14 in that it includes a beam combining means 2 and a wavelength dividing means 705 instead of the wavelength dividing means 5. Hereinafter, the description will be made for only the differences, and in the optical tomographic imaging apparatus 700 shown in FIG. 15, components identical to those of the optical tomographic imaging apparatuses in the previous embodiments are given the same reference symbols and will not be elaborated upon further here.

In the optical tomographic imaging apparatus 700, the light beam La outputted from the light source 10*a* and guided by the optical fiber FB1*a* and the light beam Lb outputted from the light source 10*b* and guided by the optical fiber FB1*b* are inputted to the beam combining means 2, and therein combined together. The combined light beams La and Lb guided through the optical fiber FB 31, passed through the circulator 501, guided by an optical fiber FB71, and inputted to a beam splitting means 703.

The beam splitting means 703 is formed of, for example, a 2×2 optical coupler with a branching ratio of 90:10. It is noted that the beam splitting means 703 functions also as a beam combining means. The beam splitting means 703 splits the light beams La and Lb into the measuring beam L1*a* and L1*b* and reference beams L2*a* and L2*b* respectively at a ratio of 90:10, and outputs the measuring beams L1*a* and L2*a* to an optical fiber FB72, and reference beams L2*a* and L2*b* to an optical fiber FB73.

The measuring beams L1*a* and L1*b* are inputted to the probe 30 through the optical rotary connector 31, which are guided through the probe 30 and irradiated onto the measuring object S. Reflected beams from the measuring object S at that time are inputted to the probe 30, guided through the probe 30 and optical fiber FB72, and inputted to the beam splitting means 703.

In the mean time, the reference beams L2a and L2b are guided through the optical fiber FB73 to a reflection type optical path length control means 720 connected to the end of the optical fiber FB73 where the optical path length thereof is controlled, then guided again by the optical fiber FB73 and inputted to the beam splitting means 703.

In the beam splitting means 703, the reflected beams L3a and L3b are combined with the reference beams L2a and L2b. Then, an interference beam L4a is produced through the combination of the reflected beam L3a and reference beam L2a, and an interference beam L4b is produced through the combination of the reflected beam L3b and reference beam L2b. Here, the light beams La and Lb are outputted from different light sources, so that the combination of the reflected beam L3a with the reference beam L2b, or the combination of the reflected beam L3b with the reference beam L2a does not produce any interference beam.

The interference beams L4a and L4b are guided through the optical fiber FB71, passed through the circulator 501, guided through the optical fiber FB74, and inputted to the wavelength dividing means 705.

The wavelength dividing means 705 has a wavelength dividing function identical to that of the wavelength dividing means 5 of the optical tomographic imaging apparatus 100 shown in FIG. 1, and is formed of, for example, a WDM coupler. In the wavelength dividing means 705, most of the interference beam L4a is outputted to an optical fiber 75a and inputted to a beam splitting means 701a, and most of the interference beam L4b is outputted to an optical fiber 75b and inputted to a beam splitting means 701b. Each of the beam splitting means 701a and 701b is formed of, for example, a 2×2 optical coupler with a branching ratio of 50:50. In the beam splitting means 701a and 701b, the interference beams L4a and L4b are divided into halves and outputted to the interference detection means 40a and 40b respectively. It is noted that the wavelength dividing means 705 functions as the wavelength dividing means of the present invention.

The structures and operations of the following interference detection means 40a and 40b, and tomographic image processing means 50 are identical to those of the first embodiment, so that they will not be elaborated upon further here.

Figure 16:
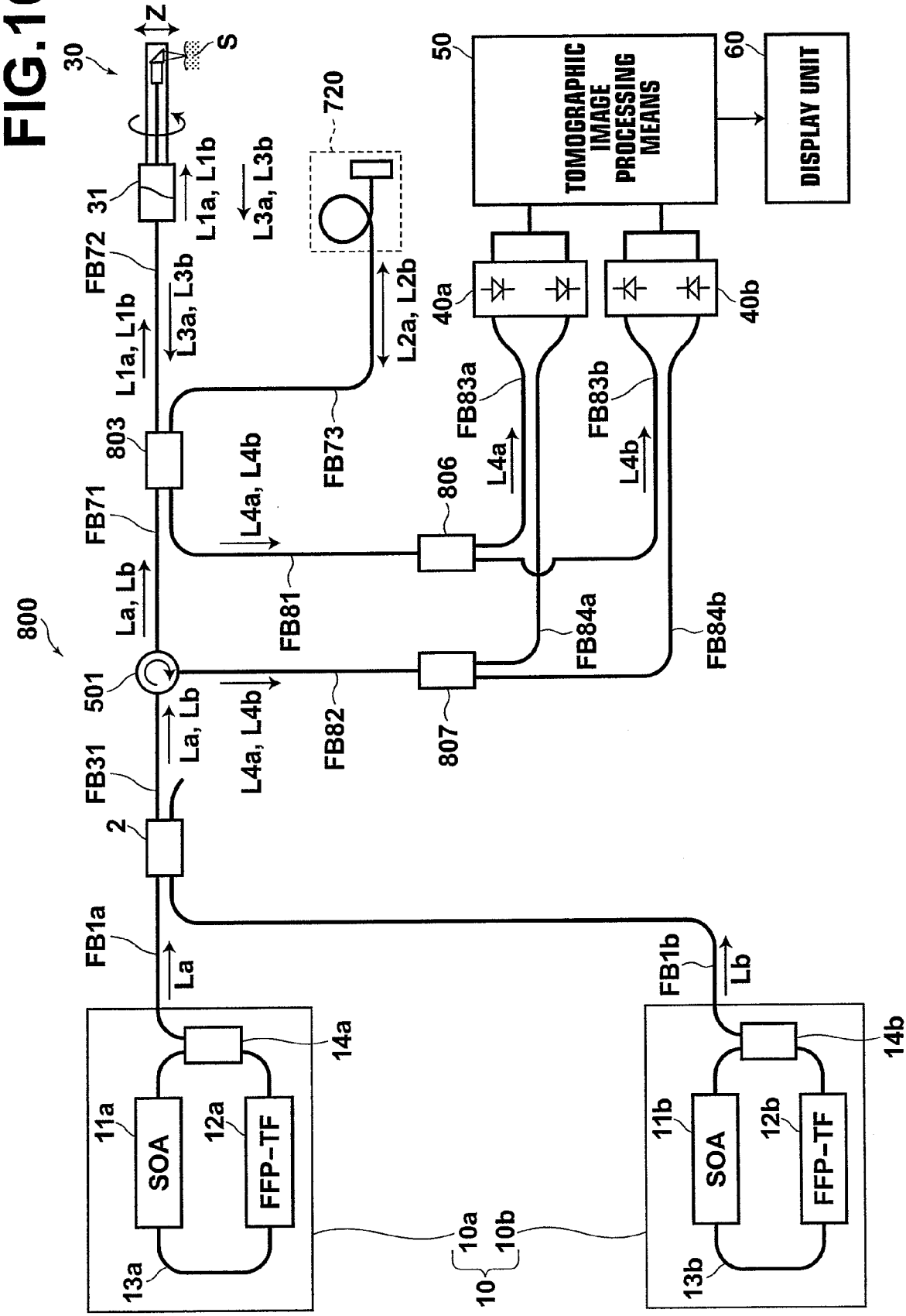
FIG. 16 is a schematic configuration diagram of the optical tomographic imaging apparatus according to a ninth embodiment of the present invention.

Next, the optical tomographic imaging apparatus 800 according to a ninth embodiment of the present invention will be described with reference to FIG. 16. FIG. 16 is a schematic configuration diagram of the optical tomographic imaging apparatus 800. The optical tomographic imaging apparatus 800 is a SS-OCT system using a Michelson interferometer. In the optical tomographic imaging apparatus 800 shown in FIG. 16, components identical to those of the optical tomographic imaging apparatuses in the previous embodiments are given the same reference symbols and will not be elaborated upon further here.

The optical tomographic imaging apparatus 800 includes a beam splitting means 803 instead of the beam splitting means 703 of the optical tomographic imaging apparatus 700. The beam splitting means 803 is formed of, for example, a 2×2 optical coupler with a branching ratio of 50:50. The optical tomographic imaging apparatus 800 is identical to the optical tomographic imaging apparatus 700 in that the light beams La and Lb outputted from the light sources 10a and 10b respectively are combined together by the beam combining means 2, passed through the circulator 501, and guided through the optical fiber FB71.

Thereafter, the light beams La and Lb are inputted to the beam splitting means 803, where they are split into the measuring beams L1a and L1b, and the reference beams L1a and L2b at a ratio of 50 to 50, and the measuring beams L1a and L1b are outputted to the optical fiber FB72, and the reference beams L2a and L2b are outputted to the optical fiber FB73.

The measuring beam L1a and L1b are inputted to the probe 30 through the optical rotary connector 31, which are guided through the probe 30 and irradiated onto the measuring object S. Reflected beams from the measuring object S at that time are inputted to the probe 30, guided through the probe 30 and optical fiber FB72, and inputted to the beam splitting means 803.

In the mean time, the reference beams L2a and L2b are guided through the optical fiber FB73 to the reflection type optical path length control means 720 connected to the end of the optical fiber FB73 where the optical path length thereof is controlled, then guided again by the optical fiber FB73 and inputted to the beam splitting means 803.

In the beam splitting means 803, the reflected beams L3a and L3b are combined with the reference beams L2a and L2b. Then, an interference beam L4a is produced through the combination of the reflected beam L3a and reference beam L2a, and an interference beam L4b is produced through the combination of the reflected beam L3b and reference beam L2b. Approximately 50% of each of the interference beams L4a and L4b is outputted to an optical fiber FB81 and inputted to a wavelength dividing means 806. The remaining approximately 50% of each of the interference beams L4a and L4b is outputted to an optical fiber FB71, passed through the circulator 501, guided by an optical fiber FB82, and inputted to a wavelength dividing means 807.

The wavelength dividing means 806 and 807 has a wavelength dividing function identical to that of the wavelength dividing means 5 of the optical tomographic imaging apparatus 300 shown in FIG. 9, and is formed of, for example, a WDM coupler. The wavelength dividing means 806 outputs most of the interference beam L4a to an optical fiber FB83a, and most of the interference beam L4b to an optical fiber FB83b. The wavelength dividing means 807 outputs most of the interference beam L4a to an optical fiber FB84a, and most of the interference beam L4b to an optical fiber FB84b. The interference beams L4a guided by the optical fibers FB83a and FB84a are inputted to the interference beam detection means 40a. The interference beams L4b guided by the optical fibers FB83b and FB84b are inputted to the interference beam detection means 40b. It is noted that the wavelength dividing means 806 and 807 function as the wavelength dividing means of the present invention.

The structures and operations of the following interference detection means 40a and 40b, and tomographic image processing means 50 are identical to those of the first embodiment, so that they will not be elaborated upon further here.

It is noted that where the light beam is split into the measuring beam and reference beam at a ratio of 50 to 50 using a Michelson interferometer as in the optical tomographic imaging apparatus 800, a modification may be made in which the wavelength dividing means is disposed on the side of the probe 30 of the interferometer as in the optical tomographic imaging apparatus 500 shown in FIG. 13.

In each of the embodiments, the description has been made of a case in which the wavelength ranges of the light beams La and Lb are partially overlapping with each other, but the present invention is not limited to this. Each of the light beams La and Lb may have a discrete wavelength range. In such a case, intermediate tomographic information (reflectivities) ra(z) and rb(z) at each dept position of the measuring object S may be detected by the tomographic image processing means by performing a frequency analysis on each of the interference signal ISa obtained by the interference detection means 40a through a photoelectrical conversion and the interference signal ISb obtained by the interference detection means 40b through a photoelectrical conversion, and a tomographic image of the measuring object may be obtained using the obtained intermediate tomographic information ra(z) and rb(z). More specifically, the tomographic image processing means first detects the intermediate tomographic information ra (z), which is based on the light beam La, by performing a frequency analysis on the interference signal ISa, then detects the intermediate tomographic information rb(z), which is based on the light beam Lb, by performing a frequency analysis on the interference signal ISb. Then, the average value r(z) of the intermediate tomographic information ra(z) and rb(z) at each depth position "z" is calculated, r(z)=(ra(z)+rb(z))/2. Thereafter, the tomographic image may be generated using the tomographic information r(z).

Further, in each of the embodiments, the light receiving element of each of the interference beam detection means 40a and 40b may be selected from, for example, InGaAs photodiode, Si photodiode, and the like, according to the wavelength range of the light beam La and the wavelength range of the light beam Lb.

Conventional apparatuses are structured such that the entire wavelength range of the light beam outputted from the light source unit needs to be covered by a single detector, and a usable photodiode for a light beam with the aforementioned wavelength ranges λa and λb has not been available. Thus, an apparatus capable of performing measurement using the combination of the wavelength ranges λa and λb has not been constructed. According to the optical tomographic imaging apparatuses of the present invention, however, a plurality of interference beam detection means is provided to enable detection with respect to each of the light beams, so that the measurement using the combination of the wavelength ranges λa and λb is allowed. Since the emission process of a semiconductor laser used for the light source and the light receiving process of a photodiode used for the photodetector are based on the same principle, so that a light beam within the emission band of a semiconductor laser made of a certain medium may be detected by a photodiode made of the same medium. Therefore, use of them as a pair allows the entire emission wavelength range to be covered and measured.

Still further, in the optical tomographic imaging apparatuses having a plurality of interferometers as shown in FIGS. 10, 11, and 14, it is preferable that BIG ($Bi_3Fe_5O_{12}$) be used for the circulator 4a of the interferometer to which a light beam with a wavelength within the wavelength range λa is inputted, and YIG ($Y_3Fe_5O_{12}$) be used for the circulator 4a of the interferometer to which a light beam with a wavelength within the wavelength range λb is inputted. Conventional apparatuses are structured such that the entire wavelength range of the light beam outputted from the light source unit needs to be covered by a single circulator, which poses a problem that the absorption loss is great in either one of the wavelength ranges, and the light utilization efficiency is degraded greatly. Each of the optical tomographic imaging apparatuses shown in FIGS. 10, 11, and 14, however, is equipped with an interferometer for each light beam, so that the aforementioned problem may be eliminated.

If the center frequency of the swept wavelength range is 1.0 μm, then it is preferable that TGG ($Tb_3Ga_5O_{12}$) be used for the circulator. Whereas in the conventional apparatuses, the coupler, dichroic mirror, optical fiber and the like, as well as the circulator, need to cover the entire wavelength range to be used, in the optical tomographic imaging apparatuses according to the embodiments of the present invention, they need to cover only the respective wavelength ranges, so that the required specifications of the optical components and parts used may be relaxed, thereby the component cost may be reduced.

It is noted that the wavelength ranges of the optical tomographic imaging apparatuses of the present invention are not limited to those described above, and the wavelength ranges may be changed appropriately according to the composition of the measuring object S. For example, by combining a light beam in a wavelength range with small interaction with the measuring object (e.g., 1000 nm range less affected by water dispersion) and a light beam in a wavelength range with large interaction with the measuring object (e.g., 800 nm range), a high resolution tomographic image information may be obtained, and spectroscopic information of the measuring object, including absorption, dispersion, and fluorescence characteristic, and the like may be measured at the same time.

Where the optical tomographic imaging apparatus of the present invention is applied to an endoscope, if a light beam with a wavelength within a wavelength range which may be sensed by the CCD mounted in the endoscope, for example, a light beam with a center wavelength of 800 nm, is used as a light beam of a wavelength combined light source, the light beam may be used also as the aiming light, so that a separate aiming light source will not be required.

The two light beams outputted from the light source unit of each of the optical tomographic imaging apparatuses according to first to ninth embodiments have different wavelength ranges. In the past, it has been thought to be ideal that the light source used for the OCT system have a Gaussian shape spectrum. In the TD-OCT system, the use of a light source having a spectrum shape departing from the Gaussian shape poses a problem that the resolution of the image is degraded due to the development of sidelobes. In the FD-OCT measurement that measures spectrum signals, the spectrum of the light source is measured in advance, and interference signals are multiplied by a filter function obtained by the measurement, thereby the interference signals are approximated to those obtainable if the spectrum had a Gaussian shape. But, the spectrum of the light source corresponding to the depth range for obtaining a tomographic image is required to be continuous. For example, a discrete spectrum shape in which the light intensity becomes zero in the middle of the emission band has been thought to be inappropriate for proper processing.

Further, in the conventional OCT system, it is desired that the light source has a wide wavelength range in order to realize high resolution measurement. As for the light source, a semiconductor light source, such as a small and inexpensive superluminescence diode (SLD), semiconductor optical amplifier, or the like, is desirable. But, the gain bandwidths of these devices are limited due to their medium characteristics, so that it is difficult to realize a continuous bandwidth exceeding 100 nm with a single device.

Consequently, methods for broadening the wavelength range by combining light beams outputted from a plurality of light sources are devised, such as the method described in Japanese Unexamined Patent Publication No. 2002-214125. One of these methods combines light beams outputted from a plurality of light sources using a coupler with a branching ratio of 50:50. But, the method suffers from a disadvantage that the light utilization efficiency is degraded since the total output is reduced to a half by the coupler. Another method is to combine the light beams using a polarization beam splitter, but this method allows beam combination of up to only two beams.

That is, Fourier transform method in OCT measurement requires that the spectrum of the light source is continuous and broadband. Therefore, the light source unit 10 that outputs discrete light beams La and Lb has been though not to be suitable as the conventional OCT light source for obtaining a tomographic image.

As explained in the first embodiment of the present invention, however, it has been found that the use of the light source unit 10 that outputs a plurality of light beams La and Lb, each not having a broadband wavelength range but a different wavelength range with each other may provide a high resolution tomographic image. This may eliminate the necessity to use a specific light source that outputs a light beam having a continuous and broadband spectrum. Further, in the tomographic image processing means 50, a tomographic image is generated from the reflected intensities of two interference beams having different wavelengths, so that even the use of a discontinuous spectrum light source may provide a tomographic image without sidelobes, thereby a high resolution image may be obtained.

Further, the capability of obtaining a high resolution tomographic image by the use of a plurality of light beams having different wavelengths allows the selection between a high resolution type using many light beams and an inexpensive low resolution type using a fewer number of light beams, so that the measurement may be performed in response to the requirements.

All of the optical tomographic imaging apparatuses according to first to eight embodiments and an alternative embodiment are SS-OCT systems. As described in the section under "Description of the Related Art", the SS-OCT system is superior to the SD-OCT system in measuring rate. More specifically, assuming, for example, an OCT system with a wavelength range of 200 nm and a wavelength resolution of 0.1 nm, more than 2000 data points are required in order to obtain a high resolution optical tomographic image, and more than 4000 data points are desirable in order to know the spectral shape more accurately. Further, it is desirable that the OCT system may display a two dimensional tomographic image as a motion image. For example, when an image with 2000 data points within the measuring wavelength range and 1000 lines in the direction orthogonal to the optical axis is displayed at an iteration rate of 10 Hz, a data readout rate of 20 MHz is required.

As described above, in the SD-OCT system, in order to increase the number of data points, it is necessary to increase the number of elements of the detector. One of the currently available detector arrays of InGaAs elements having light receiving sensitivity at near infrared region is a detector array with 1024 elements (for example, Model Number: SU-LDV-1024LE, manufactured by Sensors Unlimited Inc.), but such detector array is expensive. In order to obtain more than 2000 data points, or more than 4000 data points, at least two, and preferably four expensive 1024-element detector arrays are required. Further, highly accurate positional alignment is required when a plurality of detector arrays is connected. Still further, the comparison result of the specifications between the 1024-element detector array described above and a 512-element detector array (Model Number: SU-LDV-512LD, manufactured by Sensors Unlimited Inc.) shows that the maximum line rate is 12820 frames/second for the 512-element detector array, while that of the 1024-element detector array is 4266 frames/second, which shows that the readout rate for a single line decreases as the number of elements is increased. The decrease in the readout rate for a single line poses a problem that the frame rate of an image is decreased.

In contrast, in the SS-OCT system, the increase in the data points may be realized inexpensively by increasing the sampling interval of the detector. In the example described above, when an image with 1000 lines in the direction orthogonal to the optical axis is displayed at an iteration rate of 10 Hz, if data points are 4000, then data need to be obtained with a sampling rate of 40 MHz, which may be readily realized with a single photodiode element and an inexpensive electrical circuit.

When broadening the bandwidth of the measuring beam, the SD-OCT system requires an optical design change, such as a wavelength dispersion element, such as grating, of the interference beam detection means, and light focusing element, such as a lens, whereas in the SS-OCT system, the broadening of the bandwidth may be realized easily, since it only requires the addition of a WDM coupler and a detector.

It will be appreciated that the present invention is not limited to the embodiments described above, and various changes and modifications may be made in the invention without departing from the scope and spirit thereof. For example, in each of the embodiments, the description has been made of a case in which a single light beam is outputted from a single gain medium. But a multi-color light source that outputs a plurality of light beams having different wavelengths from a single gain medium may be used. In this case, for example, the light source units 10 of the optical tomographic imaging apparatuses shown in FIGS. 10, 13, 15, and 16 may be replaced with the multi-color light source.

Figure 17:
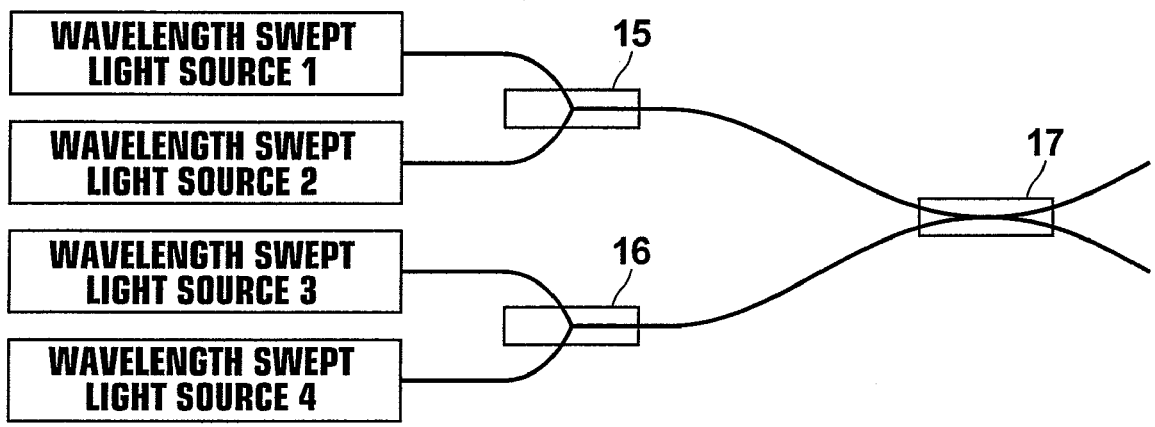
FIG. 17 illustrates an example method for combining light beams from four light sources.
Figure 18:
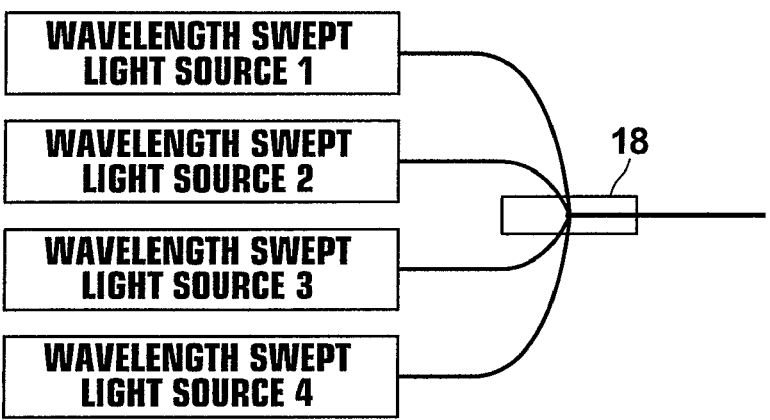
FIG. 18 illustrates another example method for combining light beams from four light sources.

In the aforementioned examples, the description has been made of a case in which two light beams are used in order to simplify the explanation, but three or more light beams may also be used. Where "n" light beams are used, the light source unit may be constructed using, for example, an n×1 WDM coupler or a plurality of WDM couplers. FIG. 17 illustrates an example structure when n=4, in which light beams outputted from four wavelength swept light sources 1 to 4 are combined using two 2×1 WDM couplers 15 and 16, and a 2×2 WDM coupler 17. FIG. 18 illustrates another example structure when n=4, in which light beams outputted from four wavelength swept light sources 1 to 4 are combined using a 4×1 WDM coupler 18.

Further, such a structure may be employed in which the light sources described in Japanese Unexamined Patent Publication No. 2006-047264 and U.S. Pat. No. 6,665,320 are used as a pair, and a plurality of light source pairs is combined.

In each of the embodiments, the description has been made of a case in which a plurality of fiber ring type wavelength swept light sources is used as the light source unit. But other types of wavelength swept light sources may also be used. For example, a wavelength swept light source that uses a diffraction grating, polygon, bandpass filter, or the like as the wavelength selection means, and a rare-earth doped optical fiber, or the like as the gain medium may also be used.

Further, in each of the embodiments, the description has been made of a case in which the spectrum of each of the light beams outputted from the light source unit has substantially a Gaussian shape, but the shape is not limited to this. For example, the light beam may have a spectrum having a constant light intensity with respect to each wavelength.

The emission wavelength band of a single light source is not limited to those illustrated as examples, but it should not be less than a predetermined wavelength range that allows OCT measurement using a single light source. There are no specific boundary values for the predetermined wavelength range, but if a system with a resolution less than in the order of approximately 1 mm is envisioned, it is in the order of approximately more than several tens of GHz in terms of the frequency band of the light.

Further, in each of the embodiments, the description has been made of a case in which the light beams are guided by the optical fiber, and combined or split by the optical coupler or WDM coupler. Alternatively, a bulk optical system may be employed in which beam combining and splitting is performed spatially using a mirror, prism, dichroic mirror, dichroic prism, or the like. Instead of the optical fiber probe, a galvanomirror may be used to scan the spatially propagating beam.

Still further, in each of the embodiments, the description has been made of a case in which reflected beam from a measuring object or back scattered light is measured. Where the measuring object is a transparent medium, such as a glass block, transparent film, or the like, and the in-plane refractive index distribution, thickness distribution, birefringence, or the like is obtained, transmitted beam is measured instead of reflected beam. In such a case, the transmitted beam may be guided to the beam combining means, instead of reflected beam, and combined with the reference beam. Here, the other structures and methods described in each of the embodiments may be applied as they are.

What is claimed is:

1. An optical tomographic imaging apparatus, comprising:
   a light source unit having a first light source that outputs a first light beam which is swept in wavelength repeatedly within a first wavelength range, and a second light source that outputs a second light beam which is swept in wavelength repeatedly within a second wavelength range which is different in range from the first wavelength range, in which a part of the wavelength sweep of the first light beam and a part of the wavelength sweep of the second light beam are performed at the same time;
   a beam splitting means that splits the first and second light beams into first measuring and reference beams, and second measuring and reference beams respectively;
   a beam combining means that combines first and second reflected beams, which are the reflected beams from a measuring object when the first and second measuring beams are irradiated on the measuring object, with the first and second reference beams respectively;
   a first interference beam detection means that detects a first interference beam produced when the first reflected beam is combined with the first reference beam by the beam combining means as a first interference signal,
   a second interference beam detection means that detects a second interference beam produced when the second reflected beam is combined with the second reference beam by the beam combining means as a second interference signal;
   a tomographic image processing means that generates a tomographic image of the measuring object using the first and second interference signals detected by the first and second interference beam detection means respectively; and
   a wavelength dividing means that outputs the reflected beams from the measuring object or the interference beams to the side of the first interference beam detection means when the wavelengths thereof are within a third wavelength range, to the side of the second interference beam detection means when the wavelengths thereof are within a fourth wavelength range which is separated from the third wavelength range, or to the side of the first interference beam detection means and the side of the second interference beam detection means when the wavelengths thereof are within a fifth wavelength range between the third and fourth wavelength ranges, wherein:
   the first wavelength range and/or the second wavelength range includes at least a portion of the fifth wavelength range; and
   the tomographic image is generated using only the first or second interference signal which is based on a light beam outputted from either one of the first and second light sources while light beams with wavelengths within the fifth wavelength range are outputted from either one of the light sources.

2. The optical tomographic imaging apparatus of claim 1, wherein, the tomographic image processing means is a means that uses only an interference signal based on a light beam outputted from either one of the first and second light sources as interference signals while light beams with wavelengths within the fifth wavelength range are outputted from either one of the light sources.

3. The optical tomographic imaging apparatus of claim 1, wherein the first interference beam detection means or the second interference beam detection means is a means that detects only the first or second interference signal which is based on a light beam outputted from either one of the first and second light sources while light beams with wavelengths within the fifth wavelength range are outputted from either one of the light sources.

4. The optical tomographic imaging apparatus of claim 1, wherein the light source unit is a unit that outputs a light beam with a wavelength within the fifth wavelength range only from either one of the first and second light sources while light beams with wavelengths within the fifth wavelength range are outputted from either one of the light sources.

5. The optical tomographic imaging apparatus of claim 2, wherein the light source unit is a unit that outputs a light beam with a wavelength within the fifth wavelength range only from either one of the first and second light sources while light beams with wavelengths within the fifth wavelength range are outputted from either one of the light sources.

6. The optical tomographic imaging apparatus of claim 3, wherein the light source unit is a unit that outputs a light beam with a wavelength within the fifth wavelength range only from either one of the first and second light sources while light beams with wavelengths within the fifth wavelength range are outputted from either one of the light sources.

7. The optical tomographic imaging apparatus of claim 4, wherein the light source unit is a unit that outputs a light beam only from either one of the first and second light sources while light beams with wavelengths within the fifth wavelength range are outputted from either one of the light sources.

8. The optical tomographic imaging apparatus of claim 5, wherein the light source unit is a unit that outputs a light beam only from either one of the first and second light sources while light beams with wavelengths within the fifth wavelength range are outputted from either one of the light sources.

9. The optical tomographic imaging apparatus of claim 6, wherein the light source unit is a unit that outputs a light beam only from either one of the first and second light sources while light beams with wavelengths within the fifth wavelength range are outputted from either one of the light sources.

10. The optical tomographic imaging apparatus of claim 7, wherein the light source unit is a unit that outputs a light beam with a wavelength within the third wavelength range from the first light source and a light beam with a wavelength within the fourth wavelength range from the second light source at the same time within a predetermined time period, and causes a light beam to be outputted only from the first light source while light beams with wavelengths within the fifth or fourth wavelength range are outputted from the first light source and only from the second light source while light beams with wavelengths within the fifth or third wavelength range are outputted from the second light source.

11. The optical tomographic imaging apparatus of claim 8, wherein the light source unit is a unit that outputs a light beam with a wavelength within the third wavelength range from the first light source and a light beam with a wavelength within the fourth wavelength range from the second light source at the same time within a predetermined time period, and causes a light beam to be outputted only from the first light source while light beams with wavelengths within the fifth or fourth wavelength range are outputted from the first light source and only from the second light source while light beams with wavelengths within the fifth or third wavelength range are outputted from the second light source.

12. The optical tomographic imaging apparatus of claim 9, wherein the light source unit is a unit that outputs a light beam with a wavelength within the third wavelength range from the first light source and a light beam with a wavelength within the fourth wavelength range from the second light source at the same time within a predetermined time period, and causes a light beam to be outputted only from the first light source while light beams with wavelengths within the fifth or fourth wavelength range are outputted from the first light source and only from the second light source while light beams with wavelengths within the fifth or third wavelength range are outputted from the second light source.

13. The optical tomographic imaging apparatus of claim 1, wherein the first and second wavelength ranges are those partially overlapping with each other.

14. The optical tomographic imaging apparatus of claim 13, wherein the tomographic image processing means is a means that connects first and second interference signals partially overlapping with each other in wavelength range obtained respectively by the first and second interference beam detection means to form a single integrated interference signal, and generates the tomographic image based on the integrated interference signal.

15. The optical tomographic imaging apparatus of claim 1, wherein the wavelength dividing means is a wavelength division multiplexing coupler.

16. The optical tomographic imaging apparatus of claim 1, wherein the beam splitting means and beam combining means are provided for each of the first and second light beams.

* * * * *